(12) United States Patent
Ueki et al.

(10) Patent No.: US 12,228,904 B2
(45) Date of Patent: Feb. 18, 2025

(54) CONTROL SYSTEM, RELAY DEVICE, AND RELAY PROGRAM

(71) Applicant: OMRON CORPORATION, Kyoto (JP)

(72) Inventors: Takuya Ueki, Ritto (JP); Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 585 days.

(21) Appl. No.: 17/434,634

(22) PCT Filed: Feb. 26, 2020

(86) PCT No.: PCT/JP2020/007799
§ 371 (c)(1),
(2) Date: Aug. 27, 2021

(87) PCT Pub. No.: WO2020/189206
PCT Pub. Date: Sep. 24, 2020

(65) Prior Publication Data
US 2022/0171361 A1 Jun. 2, 2022

(30) Foreign Application Priority Data
Mar. 15, 2019 (JP) .................... 2019-049107

(51) Int. Cl.
*G05B 19/05* (2006.01)
*G05B 23/02* (2006.01)
(52) U.S. Cl.
CPC ....... *G05B 19/058* (2013.01); *G05B 23/0216* (2013.01); *G05B 2219/1214* (2013.01)
(58) Field of Classification Search
CPC .............. G05B 19/058; G05B 23/0216; G05B 2219/1214; G05B 2219/15079; G05B 19/05
See application file for complete search history.

(56) References Cited

U.S. PATENT DOCUMENTS

2010/0045477 A1 2/2010 Saitou et al.
2014/0058538 A1 2/2014 Yaoita et al.
(Continued)

FOREIGN PATENT DOCUMENTS

CN 103430111 A 12/2013
CN 103858117 A 6/2014
(Continued)

OTHER PUBLICATIONS

International Search Report of PCT/JP2020/007799 dated Apr. 21, 2020 [PCT/ISA/210].
(Continued)

*Primary Examiner* — Tameem D Siddiquee
(74) *Attorney, Agent, or Firm* — Sughrue Mion, PLLC

(57) ABSTRACT

A control system includes a control unit, a transmission unit, an application execution unit, and an arbitration unit that arbitrates a data set exchanged between the transmission unit and the application execution unit. The arbitration means includes a first acquisition unit that acquires information about pieces of process data managed by the control unit, a second acquisition unit that acquires information about an application executed by the application execution unit, a determination unit that determines process data to be included in a data set based on the information about the pieces of process data acquired by the first acquisition unit and the information about the application executed acquired by the second acquisition unit, and a notification unit that notifies each of the transmission unit and the application execution unit of a content of the process data to be included in the data set determined by the determination unit.

10 Claims, 17 Drawing Sheets

(56) References Cited

U.S. PATENT DOCUMENTS

| | | | |
|---|---|---|---|
| 2014/0223053 A1* | 8/2014 | Yoshida | G06F 13/362 710/110 |
| 2014/0293309 A1 | 10/2014 | Ishibashi | |
| 2015/0378340 A1 | 12/2015 | Nagata | |
| 2016/0292110 A1 | 10/2016 | Niwa et al. | |
| 2018/0259929 A1 | 9/2018 | Eguchi et al. | |
| 2019/0049925 A1 | 2/2019 | Shimamura et al. | |
| 2019/0146435 A1* | 5/2019 | Brandes | G05B 19/042 700/12 |

FOREIGN PATENT DOCUMENTS

| | | |
|---|---|---|
| CN | 104079734 A | 10/2014 |
| CN | 106020094 A | 10/2016 |
| CN | 106796421 A | 5/2017 |
| CN | 108572612 A | 9/2018 |
| CN | 109388107 A | 2/2019 |
| EP | 2 672 348 A1 | 12/2013 |
| EP | 3 229 086 A1 | 10/2017 |
| JP | 04-10107 A | 1/1992 |
| JP | 08-147007 A | 6/1996 |
| JP | 2000-242326 A | 9/2000 |
| JP | 2002-358105 A | 12/2002 |
| JP | 2010-79369 A | 4/2010 |
| JP | 2012-27728 A | 2/2012 |
| JP | 2016-012173 A | 1/2016 |
| JP | 2016-110458 A | 6/2016 |
| JP | 2016-126495 A | 7/2016 |
| JP | 2017-146803 A | 8/2017 |
| RU | 2357278 * | 5/2009 ............ G06F 1/00 |

OTHER PUBLICATIONS

Written Opinion of PCT/JP2020/007799 dated Apr. 21, 2020 [PCT/ISA/237].

Extended European Search Report dated Nov. 28, 2022 in Application No. 20774588.6.

Office Action issued Jan. 10, 2024 in Chinese Application No. 202080017180.8.

* cited by examiner

CONTROL SYSTEM, RELAY DEVICE, AND RELAY PROGRAM

CROSS REFERENCE TO RELATED APPLICATIONS

This application is a National Stage of International Application No. PCT/JP2020/007799 filed on Feb. 26, 2020, claiming priority based on Japanese Patent Application No. 2019-049107 filed on Mar. 15, 2019, the entire contents of each of which being herein incorporated by reference in their entireties.

TECHNICAL FIELD

The present invention relates to a control system in which a data set including a value of process data is transmitted, a relay device included in the control system, and a relay process executed in the relay device.

BACKGROUND ART

A control device such as a PLC (Programmable Logic Controller) is introduced in various manufacturing sites. The control device is a kind of computer, and executes a control program designed according to a manufacturing device or a manufacturing facility. Such a control device is communicably connected to an information processing device such as a human machine interface (HMI).

For example, the information processing device uses information from the control device to graphically display an operating state or the like of a control target of the control device, or uses information from the control device to execute an application different from the application that is displayed.

For example, Japanese Patent Laying-Open No. 2017-146803 (PTL 1) discloses a programmable display as an example of an information processing device connected to a PLC. In the programmable display, when one screen displayed on a display screen is defined as one page, a layout of functional components displayed on the page, allocation of functions, and the like are performed in units of pages.

CITATION LIST

Patent Literature

PTL 1: Japanese Patent Laying-Open No. 2017-146803

SUMMARY OF INVENTION

Technical Problem

The programmable display disclosed in PTL 1 updates and displays the information held by the PLC every predetermined period. When such a programmable display is network-connected to the PLC, data is transmitted every predetermined period on the network.

When the data transmitted every predetermined period increases, a communication load increases. An object of the present invention is to provide a technique for preventing the increase of the communication load associated with the increase of an amount of transmitted data.

Solution to Problem

A control system according to an aspect of the present disclosure includes: a control unit configured to execute a control program controlling a control target while managing a plurality of pieces of process data referred to or updated in the control program; a transmission unit configured to generate and transmit a data set including a value of at least part of the process data of the plurality of pieces of process data managed by the control unit; an application execution unit configured to execute an application by referring to a data set transmitted by the transmission unit; and an arbitration unit configured to arbitrate the data set exchanged between the transmission unit and the application execution unit. The arbitration unit includes: a first acquisition unit configured to acquire information about the plurality of pieces of process data managed by the control unit; a second acquisition unit configured to acquire information about the application executed by the application execution unit; a determination unit configured to determine the process data to be included in the data set based on the information about the plurality of pieces of process data acquired by the first acquisition unit and the information about the executed application acquired by the second acquisition unit; and a notification unit configured to notify each of the transmission unit and the application execution unit of a content of process data to be included in the data set determined by the determination unit.

According to the present disclosure, because the process data to be included in the data set is determined based on the information about the plurality of pieces of process data and the information about the currently-executed application, the data set including the appropriate process data is generated and transmitted according to the situation. Thus, an increase in communication load can be prevented.

In the above disclosure, the second acquisition unit may acquire information specifying the process data used by a changed application at each time when the application executed by the application execution unit is changed. According to this configuration, the process data used in each application can be specified, and the data set can be efficiently determined by these pieces of information.

In the above disclosure, the determination unit may determine process data to be included in the data set according to a predetermined evaluation criterion regarding a communication load based on the information about the application acquired by the second acquisition unit. According to this configuration, the optimal data set can be determined from the viewpoint of the communication load based on the evaluation criterion.

In the above disclosure, the evaluation criterion may be based on at least one of a frequency at which each of the plurality of pieces of process data is used in the application executed in the application execution unit and importance set to each of the plurality of pieces of process data. According to this configuration, the optimal data set can be determined from the viewpoint of the communication load in consideration of factors that affect the communication load such as the frequency used in the application and the importance set to each of the plurality of pieces of process data.

In the above disclosure, the determination unit may determine the process data to be included in the data set at each time. According to this configuration, the optimal process data can be dynamically determined according to a situation.

In the above disclosure, the determination unit may select a data set corresponding to the process data determined to be included in the data set from among a plurality of predetermined data sets. According to this configuration, even when the situation changes, the process data to be included in the data set does not need to be calculated in each time, so that the processing load regarding the calculation can be reduced.

In the above disclosure, the control system may include a control device and a display device, and the arbitration unit may be disposed independently of the control device and the display device. According to this configuration, even when pluralities of control devices and display devices exist, the data set including the appropriate process data can be determined according to the situation.

In the above disclosure, the control system further includes a plurality of the application execution units including a first application execution unit and a second application execution unit, and the notification unit also notifies the second application execution unit of a content of the process data newly determined based on the information acquired by the determination unit from the first application execution unit. According to this configuration, the data set transmission scheme according to the present disclosure can be applied even in the configuration in which a plurality of application execution units exist.

According to another example of the present disclosure, a relay device disposed in a control system is provided. The control system includes: a control unit configured to execute a control program controlling a control target while managing a plurality of pieces of process data referred to or updated in the control program; a transmission unit configured to generate and transmit a data set including a value of at least part of the process data of the plurality of pieces of process data managed by the control unit; and an application execution unit configured to execute an application by referring to a data set transmitted by the transmission unit. The relay device is configured to arbitrate the data set exchanged between the transmission unit and the application execution unit. The relay device includes: a first acquisition unit configured to acquire information about the plurality of pieces of process data managed by the control unit; a second acquisition unit configured to acquire information about the application executed by the application execution unit; a determination unit configured to determine the process data to be included in the data set based on the information about the plurality of pieces of process data acquired by the first acquisition unit and the information about the executed application acquired by the second acquisition unit; and a notification unit configured to notify each of the transmission unit and the application execution unit of a content of the process data to be included in the data set determined by the determination unit.

According to still another example of the present disclosure, a relay program executed by an information processing device disposed in a control system is provided. The control system includes: a control unit configured to execute a control program controlling a control target while managing a plurality of pieces of process data referred to or updated in the control program; a transmission unit configured to generate and transmit a data set including a value of at least part of the process data of the plurality of pieces of process data managed by the control unit; and an application execution unit configured to execute an application by referring to a data set transmitted by the transmission unit. The relay program causes the information processing device to function as a relay device that arbitrates a data set exchanged between the transmission unit and the application execution unit. The relay program causes the information processing device to execute: acquiring information about the plurality of pieces of process data managed by the control unit; acquiring information about an application executed by the application execution unit; determining the process data to be included in the data set based on the acquired information about the plurality of pieces of process data and the acquired information about the acquired and executed application; and notifying each of the transmission unit and the application execution unit of a content of the process data to be included in the determined data set.

Advantageous Effects of Invention

According to the present invention, the increase of the communication load associated with the increase of the data amount can be prevented.

BRIEF DESCRIPTION OF DRAWINGS

FIG. 1 is a schematic diagram illustrating an application scene of a control system 1a.

DESCRIPTION OF EMBODIMENTS

Figure 1:
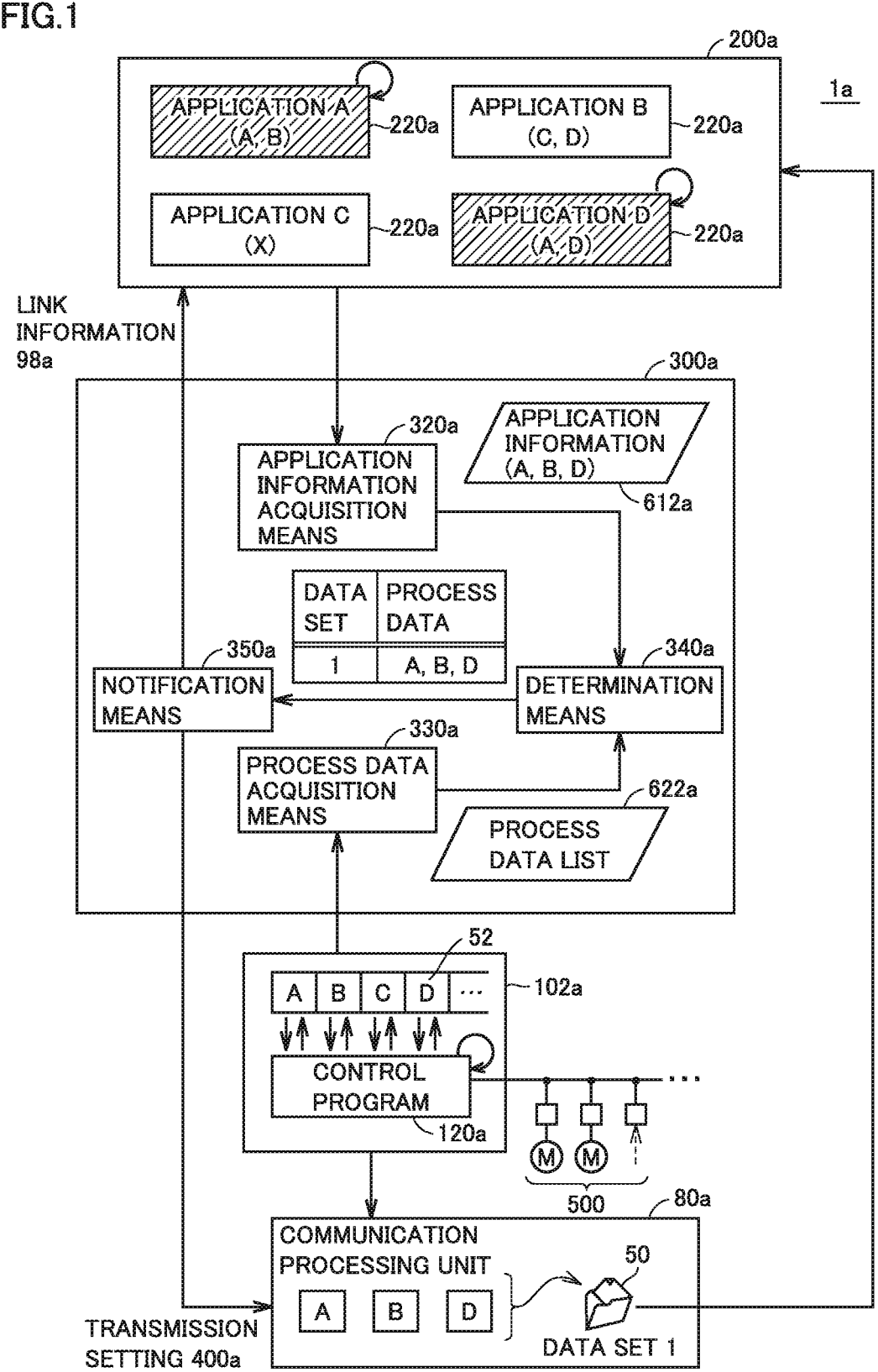

Hereinafter, an embodiment of the present invention will be described with reference to the drawings. In the following description, the same parts and components are denoted by the same reference numeral. Their names and functions are the same. Thus, the detailed description thereof will not be repeated. The following embodiment and modification described below may selectively be combined as appropriate.

§ 1. Application Examples

FIG. 1 is a schematic diagram illustrating an application scene of a control system 1a. Control system 1a includes control means 102*a*, a communication processing unit 80*a*, application execution means 200*a*, and arbitration means 300*a*.

Control means 102*a* executes a control program 120*a* in order to control a control target, and manages a plurality of pieces of process data 52 referred to or updated in control program 120*a*. For example, control means 102*a* is implemented by a controller such as a PLC and a machine controller that are used at a manufacturing site.

The control target includes various industrial devices automating a production process, and includes a device that gives some physical action to a manufacturing device, a production line, or the like (hereinafter, also collectively referred to as a "field"), and an input and output device that exchanges information with the field. In the example of FIG. 1, a field device 500 is illustrated as the control target.

As used herein, a "process data" is a term including an arbitrary data that can be referred to by control means 102*a* (as described below, typically embodied as controller 100) or application execution means 200*a* (as described below, typically embodied as an HMI 200). More specifically, the "process data" may include input data acquired from the field device, output data (command value) calculated by the control operation and provided to the field device, data temporarily calculated in order to execute the control arithmetic operation, data indicating operation content by the user, and the like.

Process data 52 includes a data input from field device 500 to control means 102*a*, a data output from control means 102*a* to the field device 500, and a data used for execution of control program 120*a* or a management state of the controller on which control means 102*a* is mounted. Process data 52 is periodically updated in association with the execution of control program 120*a*.

Communication processing unit 80*a* is an implementation example of the transmission means, and periodically transmits one or a plurality of data sets 50. Each data set 50 includes a value of at least process data 52 of the plurality of pieces of process data 52 managed by control means 102*a*. Communication processing unit 80 generates and transmits data set 50 according to transmission setting 400*a* determined by arbitration means 300.

Application execution means 200*a* executes one or a plurality of applications 220*a*. Application 220*a* is executed by referring to data set 50 (process data 52 included in data set 50) transmitted by communication processing unit 80*a*.

Application execution means 200*a* is implemented by an HMI that presents various kinds of information obtained by executing control program 120 to an operator, a supervisory control and data acquisition (SCADA) device that performs process control and centralized monitoring, a robot controller that controls a robot, an actuator, other controllers, and the like. Application execution means 200*a* can include an entire execution subject of the application that can be executed in control system 1*a*. For example, application execution means 200*a* may be configured by a plurality of HMIs.

In the example of FIG. 1, application execution means 200*a* can execute applications A, B, C, D. The type of process data used in each of applications A to D is previously designated.

In FIG. 1, the type of process data used in each application is described in alphabets under a name of the application. Specifically, application A uses pieces of process data A, B. Application B uses pieces of process data C, D. Application C uses process data X. Application D uses pieces of process data A, D.

Arbitration means 300*a* arbitrates data set 50 exchanged between application execution means 200*a* and communication processing unit 80*a*. Specifically, arbitration means 300*a* determines the type of process data 52 to be included in data set 50 such that process data 52 used for application 220*a* currently executed by application execution means 200*a* is transmitted from communication processing unit 80*a*, and notifies communication processing unit 80*a* of transmission setting 400*a*. In addition, arbitration means 300*a* notifies application execution means 200*a* of information about the data transmitted to application execution means 200*a* such that the value of process data 52 used for application 220*a* that is the execution target is read from data set 50 transmitted from communication processing unit 80*a* as link information 98*a*.

Arbitration means 300*a* includes application information acquisition means 320*a*, process data acquisition means 330*a*, determination means 340*a*, and notification means 350*a*.

Application information acquisition means 320*a* acquires information (application information 612*a*) about application 220*a* currently executed by application execution means 200*a*. Specifically, application information acquisition means 320*a* specifies process data 52 used by application 220*a* currently executed in application execution means 200*a*.

Application information acquisition means 320*a* only can specify process data 52 used for application 220*a* executed in control system 1*a*. For example, when having the information about process data 52 used for each application 220*a*, application information acquisition means 320*a* only needs to acquire the information that can specify application 220*a* to be executed from application execution means 200*a*.

When a plurality of applications 220*a* can be executed, application information acquisition means 320*a* may acquire the information (application information 612*a*) specifying the process data used by the changed application at each time the application executed by application execution means 200*a* is changed.

In the example of FIG. 1, it is assumed that application execution means 200*a* executes application A and application D. Application information acquisition means 320*a* specifies that the process data requested by application execution means 200*a* are process data A, B, D as application information 612*a*.

Process data acquisition means 330*a* acquires the information (process data list 622*a*) about the plurality of pieces of process data 52 managed by control means 102*a*. Specifically, process data acquisition means 330*a* specifies the type of process data 52 managed by control means 102*a*.

Determination means 340*a* determines process data 52 to be included in data set 50 based on application information 612*a* acquired by application information acquisition means 320*a* and process data list 622*a* acquired by process data acquisition means 330*a*. Specifically, the type of process data 52 necessary for the transmission from communication processing unit 80*a* is specified based on application information 612*a*, and it is determined to which data set specified necessary process data 52 is allocated and transmitted.

Determination means 340*a* determines the number of data sets and the type of process data 52 allocated to the data set using an evaluation index as described later. Determination means 340*a* may determine the process data to be included in the data set at each time (dynamic determination). Alternatively, determination means 340*a* may previously prepare a plurality of data sets and select the appropriate data set according to the necessary process data (static setting). That is, determination means 340a may select the data set corresponding to the process data determined to be included in the data set from among the plurality of predetermined data sets.

Notification means 350a notifies communication processing unit 80a of a content of process data 52 to be included in data set 50 determined by determination means 340a as transmission setting 400a, and notifies application execution means 200a of link information 98a.

In this way, because the process data to be included in the data set is determined based on the information about the plurality of pieces of process data and the information about the currently-executed application, the data set including the appropriate process data is generated and transmitted according to the situation. Thus, an increase in communication load can be prevented.

§ 2. Specific Examples

A specific example of a control system 1 described in the above application example will be described below.

<A. System Configuration>

Figure 2:
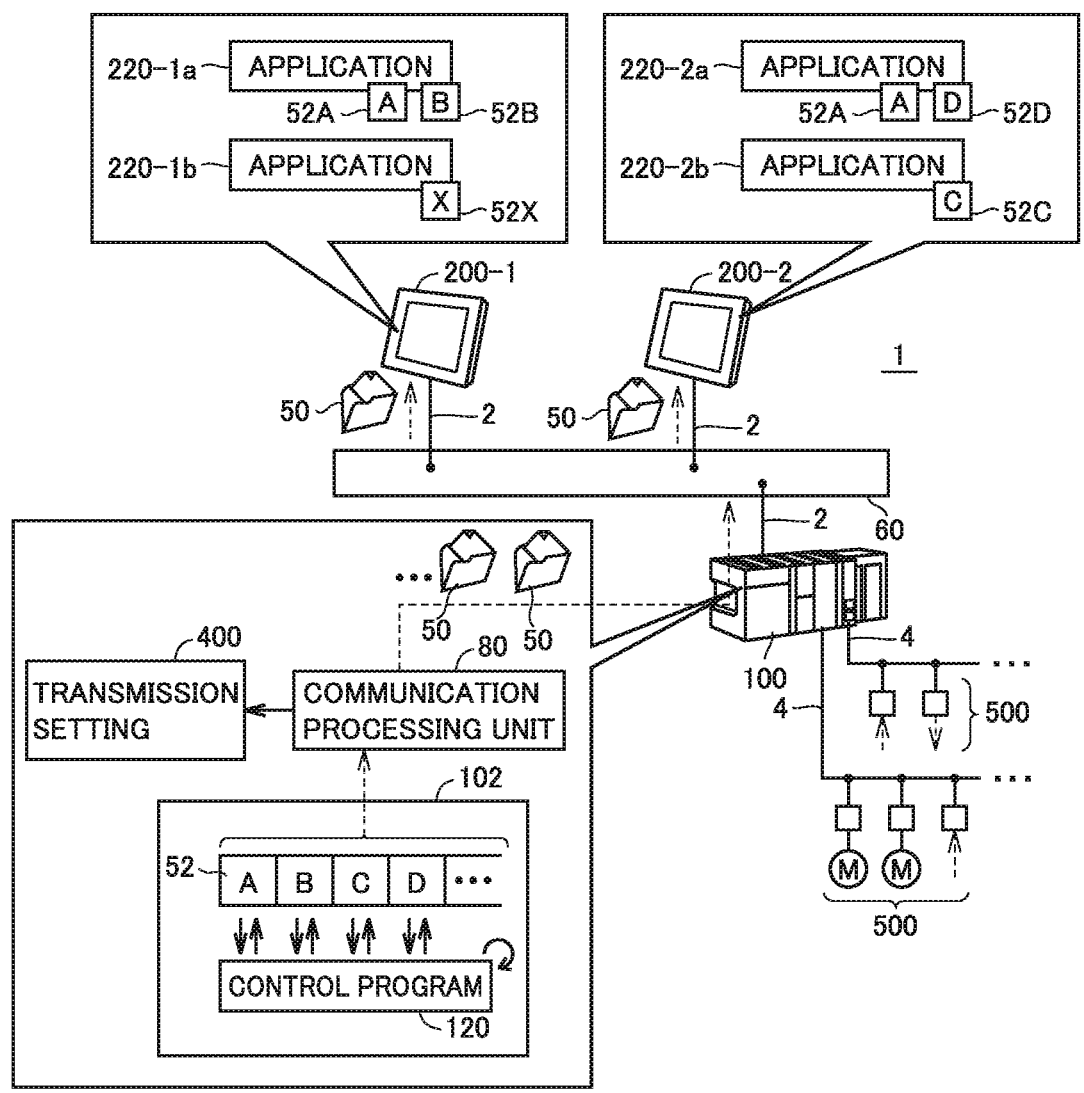
FIG. 2 is a view illustrating an outline of a control system 1 according to an embodiment.

FIG. 2 is a view illustrating an outline of control system 1 according to an embodiment. Control system 1 includes one controller 100 that is an example of the control device, a plurality of HMIs 200 (200-1, 200-2) that are an example of the display device, and a relay device 60.

Relay device 60 is a device that relays the communication between controller 100 and HMI 200, and is an implementation example of the arbitration means. In the embodiment, controller 100 and relay device 60, and relay device 60 and each HMI 200 are communicably connected to each other by information system network 2. That is, relay device 60 embodying the arbitration means may be disposed independently of controller 100 and HMI 200. As described later, the function corresponding to relay device 60 may be incorporated in either controller 100 or HMI 200.

For example, information system network 2 is a network conforming to a communication standard capable of performing data exchange without depending on a vendor, a type of an operating system (OS), or the like. For example, object linking and embedding for process control unified architecture (OPC UA) is known as the communication standard.

The communication standard adopted in information system network 2 is not limited to the OPC UA. For example, information system network 2 may be a network conforming to the communication standard specific to a specific vendor or OS, or may be a network conforming to EtherNet/IP (registered trademark) that is an industrial open network in which a control protocol is mounted on Ethernet (registered trademark).

In the example of FIG. 2, the communication between HMI 200 and controller 100 is performed by relaying through relay device 60, and performed by a publish-subscribe communication scheme of the OPC UA. Hereinafter, communication to which a publish-subscribe communication scheme of the OPC UA is applied is also referred to as PubSub communication.

Control system 1 may include a plurality of controllers 100. Control system 1 may include a plurality of HMIs 200. In addition, control system 1 may have a configuration in which one HMI 200 is communicably connected to one controller 100, a configuration in which one HMI 200 is communicably connected to a plurality of controllers 100, a configuration in which a plurality of HMIs 200 are communicably connected to one controller 100, or a configuration in which the plurality of HMIs 200 are communicably connected to the plurality of controllers 100. In the example of FIG. 2, control system 1 has a configuration in which two HMIs 200 (HMIs 200-1, 200-2) are communicably connected to one controller 100. Hereinafter, the plurality of HMIs 200 will be referred to as HMIs 200-1, 200-2 when being distinguished from each other.

Controller 100 includes control means 102 and a communication processing unit 80. Control means 102 executes a control program 120 controlling field device 500 of the control target, and manages the plurality of pieces of process data 52 referred to or updated in control program 120. For example, control means 102 is implemented by a processor that executes a system program in order to implement the basic functions of controller 100.

Field device 500 includes various industrial devices that automate a production process, and includes a device that gives some physical action to a manufacturing device, a production line, or the like (hereinafter, also collectively referred to as a "field") and an input and output device that exchanges information with the field. For example, field device 500 includes a servo driver that controls a servo motor, a robot controller that controls a robot, a sensor that is a device that collects data, an actuator that moves a conveyor, a remote input and output (I/O) device, or the like.

In the example of FIG. 2, controller 100 and field device 500 are communicably connected to each other by a control system network 4. Preferably, a network that performs fixed-period communication guaranteeing a data arrival time is used as control system network 4. EtherCAT (registered trademark), EtherNet/IP (registered trademark), DeviceNet (registered trademark), CompoNet (registered trademark), and the like are known as the network that performs the fixed-period communication.

Process data 52 includes data input from field device 500 to controller 100, data output from controller 100 to field device 500, and data used for the execution of control program 120 or state management of controller 100. Process data 52 is periodically updated in association with the execution of control program 120.

Communication processing unit 80 is configured to be able to transmit the plurality of data sets 50 including values of the plurality of pieces of process data 52 managed by control means 102. Specifically, communication processing unit 80 transmits data set 50 with reference to transmission setting 400 defining a combination of process data 52 stored in each data set 50.

Each HMI 200 executes each application 220 using process data 52 included in data set 50 transmitted by communication processing unit 80. In the example of FIG. 1, HMI 200-1 can execute an application 220-1a in which process data 52A, 52B are used and an application 220-1b in which process data 52X is used. HMI 200-2 can execute an application 220-2a in which pieces of process data 52A, 52D are used and an application 220-2b in which process data 52C is used.

<B. PubSub Communication>

Figure 3:
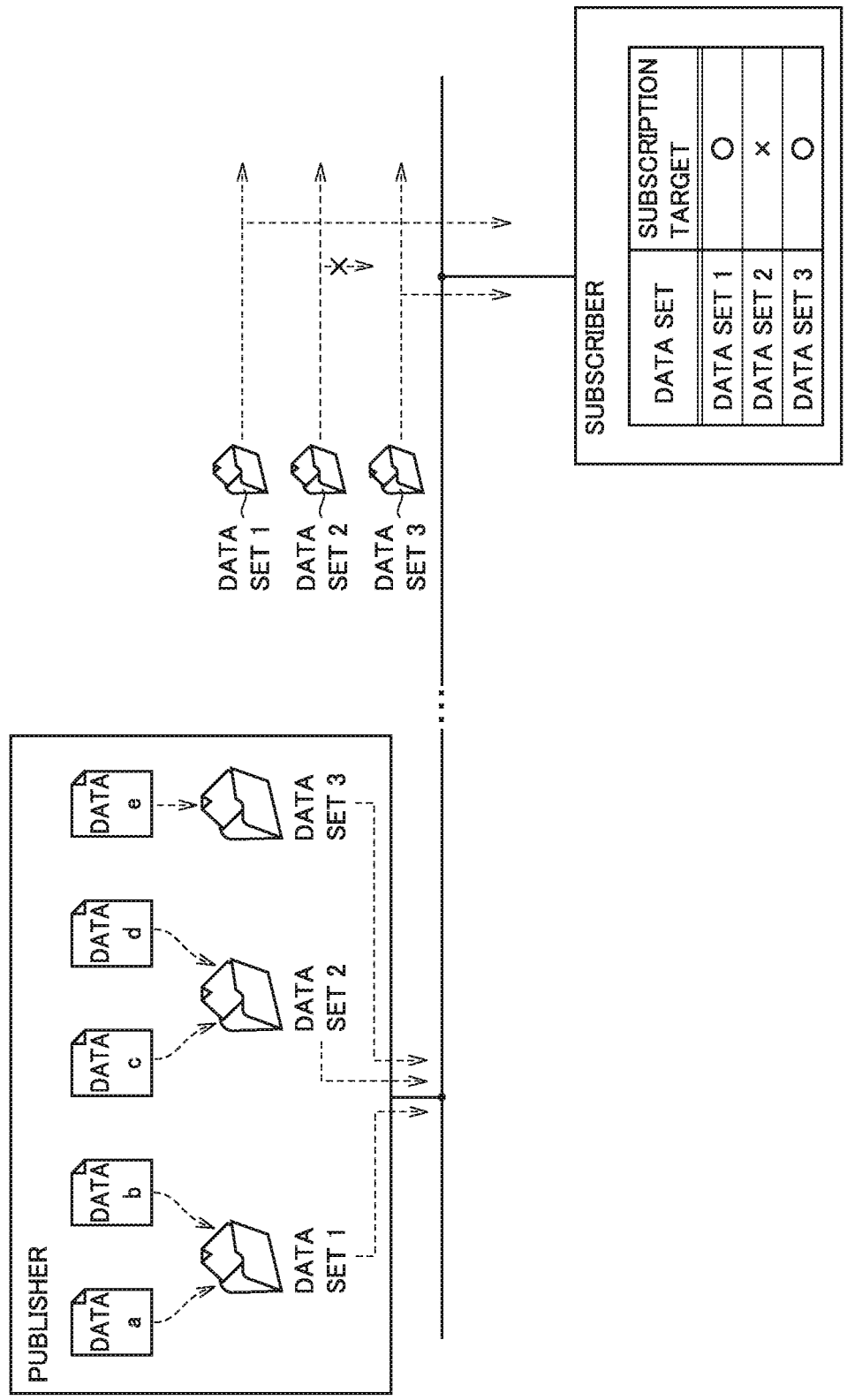
FIG. 3 is a view illustrating an outline of PubSub communication.

FIG. 3 is a view illustrating an outline of PubSub communication. In the following description, a side that distributes data is referred to as a "publisher", and a side that subscribes to data distributed by the publisher is referred to as a "subscriber". In control system 1 according to the embodiment, controller 100 corresponds to the publisher that distributes the data. On the other hand, HMI 200 corresponds to the subscriber that subscribes to the data distributed by controller 100.

The publisher generates and distributes a data set storing one or a plurality of pieces of data. The publisher transmits the data set to a network including the publisher and the subscriber without specifying a destination. This transmission form may be multicast or unicast. Depending on circumstances, this transmission form may be broadcast.

The subscriber manages which data set is set to a subscription target among data sets distributed on the network accessible by the subscriber. For example, in the example of FIG. 3, in the subscriber, data set 1 and data set 3 in data sets 1 to 3 are set to the subscription target. For this reason, the subscriber receives only data set 1 and data set 3 among data sets 1 to 3 distributed by the publisher. When the subscriber changes the subscription target, the subscriber changes a reception target.

The subscriber may receive the data set that is not the subscription target, and in this case, the subscriber may perform processing of discarding the data set that is not the subscription target.

The method by which the subscriber manages the subscription target is not limited to the method in FIG. 3. For example, whether to subscribe to each piece of data may be managed. Whether to subscribe to each set of data different from the data set may be managed as another method.

Figure 4:
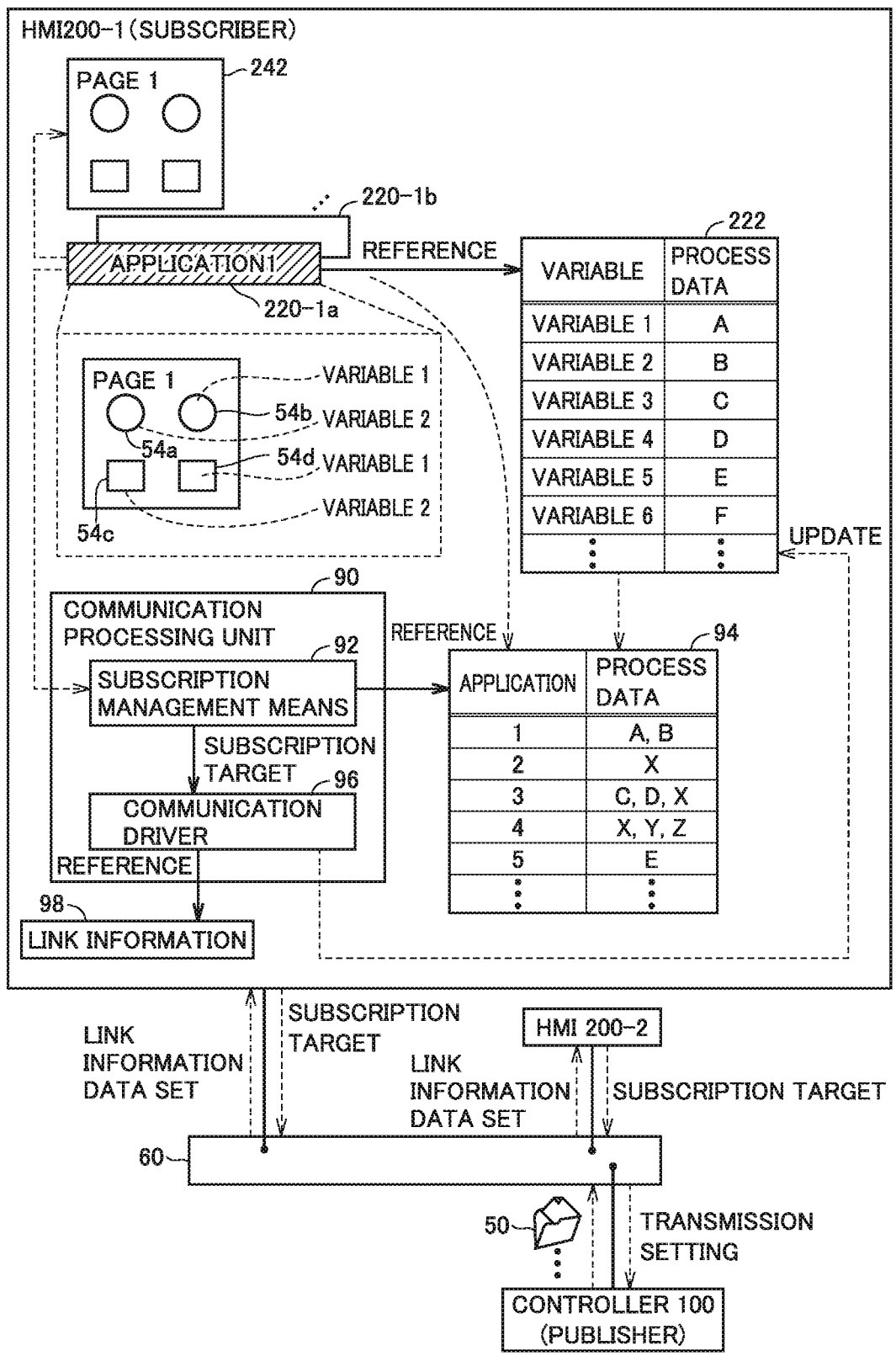
FIG. 4 is a view illustrating an outline of an HMI 200-1 that functions as a subscriber.
Figure 5:
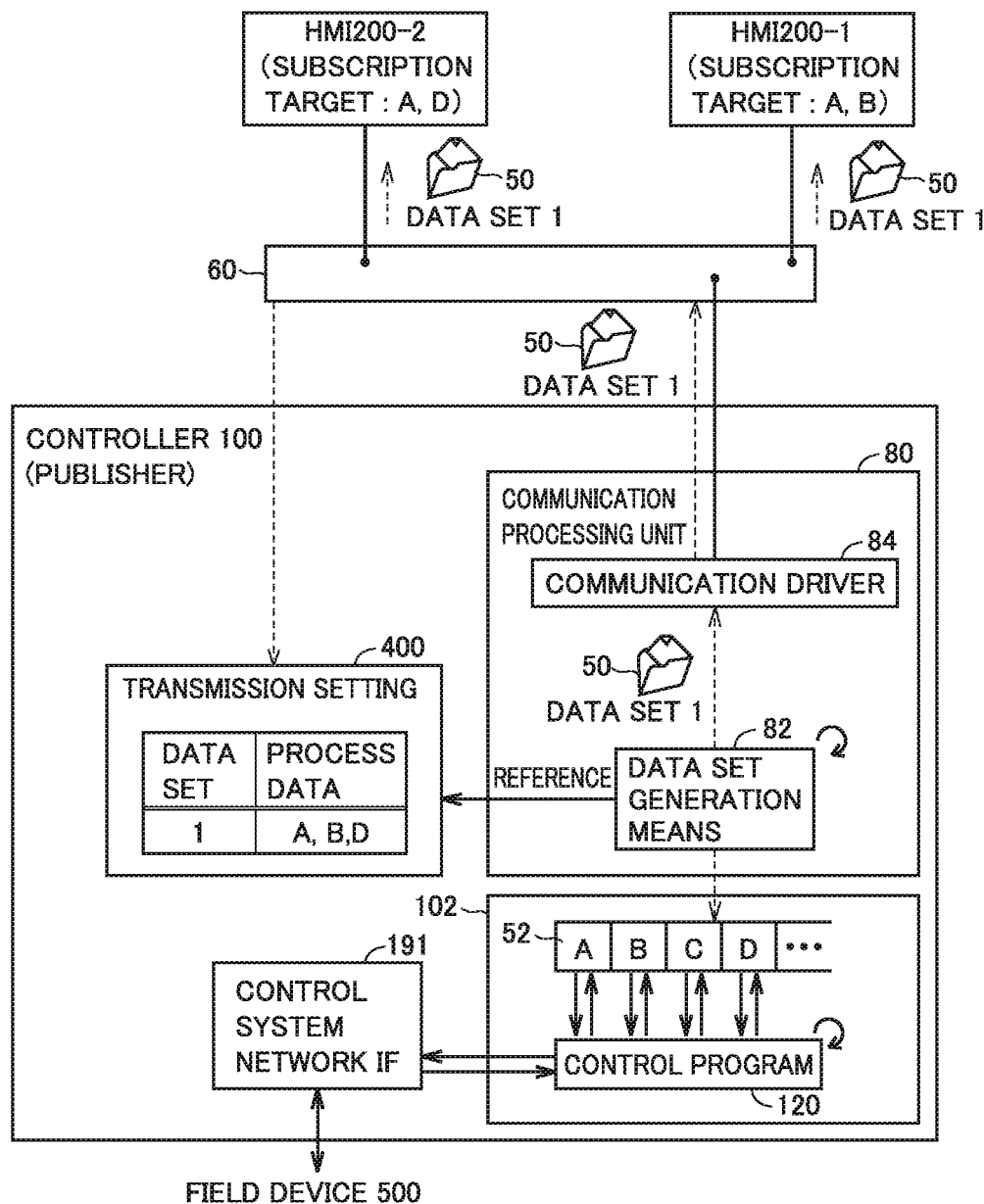
FIG. 5 is a view illustrating an outline of a controller 100 that functions as a publisher.

With reference to FIGS. 4 and 5, an outline of PubSub communication between HMI 200 and controller 100 will be described. FIG. 4 is a view illustrating an outline of HMI 200-1 that functions as the subscriber. FIG. 5 is a view illustrating an outline of controller 100 that functions as the publisher. In FIG. 4, HMI 200-1 will be described as an example, but HMI 200-2 also has the same configuration as HMI 200-1.

Referring to FIG. 4, HMI 200-1 includes a display 242, a plurality of applications 220 (220-1*a*, 220-1*b* . . . ), and a communication processing unit 90 that is an OPC UA client. Each application 220 is a program displaying a specific page on display 242. FIG. 4 illustrates an example in which an application 1 displaying page 1 on display 242 is executed.

Each page includes a plurality of objects 54. For example, page 1 includes an object 54*a* to an object 54*d*. The display of object 54 is updated according to a value of a variable included in the program. For example, the display of object 54*a* is updated according to the value of a variable 2. Similarly, the display of object 54*b* is updated according to the value of a variable 1, the display of object 54*c* is updated according to the value of variable 2, and the display of object 54*d* is updated according to the value of variable 1.

Application 220 refers to mapping information 222 to update the value of the variable. Mapping information 222 is information in which the variable and the process data are associated with each other. For example, the value of variable 1 is updated according to the value of process data 52A. The period at which the value of each process data is updated may be set by the user according to the production of application 220, or determined according to the update period of controller 100 that manages the process data.

Communication processing unit 90 is an OPC UA client, and causes HMI 200 to function as the subscriber. Communication processing means 90 includes subscription management means 92 and a communication driver 96.

Subscription management means 92 manages the subscription target according to currently-executed application 220. Specifically, subscription management means 92 specifies the subscription target by referring to subscription management information 94 generated based on application 220 and mapping information 222, and notifies communication driver 96 of the subscription target. Communication driver 96 receives data set 50 including process data 52 of the subscription target, and updates the value of process data 52 used by application 220.

Subscription management information 94 is information in which application 220 is associated with process data 52 used in application 220, and is generated based on application 220 and mapping information 222.

For example, when application 1 is executed, subscription management means 92 refers to subscription management information 94 and specifies that process data 52A, 52B are used for executing application 1. Subscription management means 92 notifies communication driver 96 of the start of subscription to process data 52A, 52B. When the execution target of the application is switched, subscription management means 92 also notifies communication driver 96 of the information about process data 52 stopping the subscription together with the information about process data 52 starting the subscription.

Communication driver 96 reads data set 50 including process data 52 of the subscription target from among the plurality of data sets 50 distributed by controller 100. More specifically, communication driver 96 refers to link information 98 specifying process data 52 stored in each data set 50, and specifies data set 50 including process data 52 of the subscription target from among the plurality of data sets 50 that are distributed by controller 100 through relay device 60.

In the embodiment, the request of the subscription target is made from HMI 200 to relay device 60, and in response to the request, relay device 60 generates transmission setting 400, and notifies controller 100 of transmission setting 400. In addition, relay device 60 generates link information 98 together with the generation of transmission setting 400, and notifies each HMI 200.

Referring to FIG. 5, controller 100 includes control means 102, a control system network interface (IF) 191, and a communication processing unit 80 that is an OPC UA server.

Control means 102 controls field device 500 by executing control program 120. For example, control program 120 updates the value of process data 52 using the state value of field device 500 input through control system network IF 191, and executes the control arithmetic calculation with reference to the updated value of process data 52. Control program 120 updates the value of process data 52 according to the result of the executed control arithmetic calculation, and outputs the updated value of process data 52 as the control value to field device 500 through control system network IF 191.

Communication processing unit 80 is an OPC UA server, and causes controller 100 to function as the publisher. Communication processing unit 80 includes data set generation means 82 that generates data set 50 and a communication driver 84 that transmits data set 50.

Data set generation means 82 refers to transmission setting 400 to generate data set 50 storing one or a plurality of pieces of process data 52. Data set 50 may refer to a set of process data 52 or a data set in a format that can be output onto information system network 2.

Transmission setting 400 is information that specifies process data 52 stored in one data set 50. Only one process data 52 may be specified to be stored in one data set 50, or the plurality of pieces of process data 52 may be specified to be stored in one data set. That is, the term "data set" means a combination of one or more process data 52 stored in data set 50. Transmission setting 400 is generated by relay device 60 in response to the request from HMI 200, and relay device 60 notifies controller 100 of transmission setting 400.

Communication driver 84 transmits data set 50 generated by data set generation means 82 to relay device 60. Relay device 60 transmits transmitted data set 50 to each HMI 200.

Referring to FIG. 5, the data exchange between HMI 200 and controller 100 when the subscription target of HMI 200-1 are process data 52A, 52B while the subscription targets of HMI-200-2 are process data 52A, 52D will be described. In FIG. 5, process data 52A, 52B, 52D are described while reference numerals are partially omitted. Hereinafter, process data 52A, 52B, 52D, 42X are also simply referred to as process data A, B, D, X.

In the example of FIG. 5, storing process data A, B, D in data set 1 is defined by transmission setting 400. Controller 100 periodically generates data set 1 and transmits data set 1 to relay device 60.

HMI 200-1 acquires data set 1 distributed by relaying relay device 60 from controller 100. Because data set 1 is periodically transmitted, HMI 200-1 periodically acquires data set 1. Thus, HMI 200-1 can periodically update the variables corresponding to process data 52A and process data 52B, and also updates the display of object 54 according to the update of the variable.

HMI 200-2 acquires data set 1 distributed by relaying relay device 60 from controller 100. Because data set 1 is periodically transmitted, HMI 200-2 periodically acquires data set 1. Thus, HMI 200-2 can periodically update the variables corresponding to process data 52A and process data 52D, and also updates the display of object 54 according to the update of the variables.

<C. Functional Configuration of Relay Device>

Figure 6:
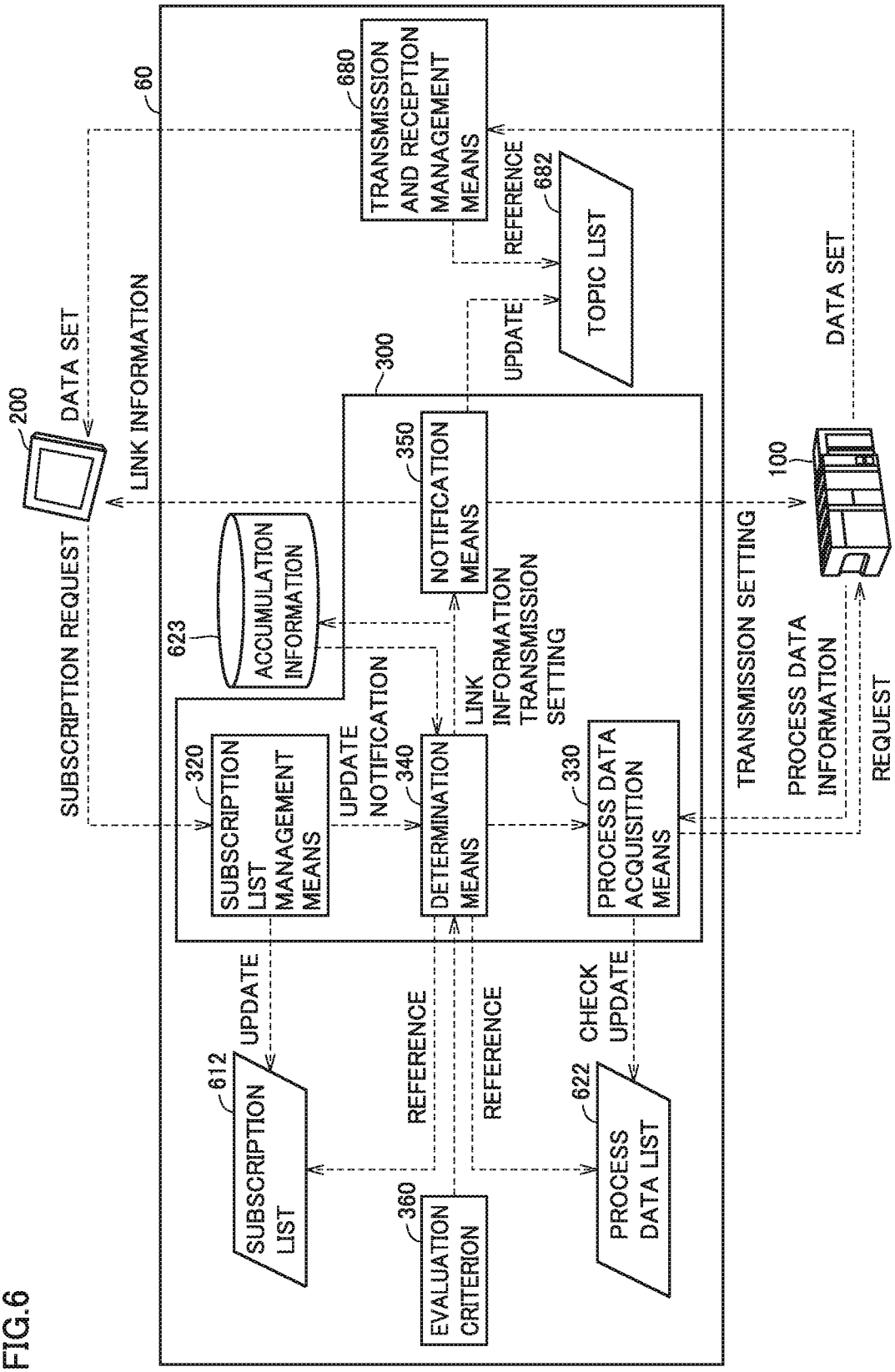
FIG. 6 is a view illustrating a functional configuration of a relay device 60.

With reference to FIG. 6, an example of processing executed by relay device 60 functioning as the arbitration means will be described. FIG. 6 is a view illustrating a functional configuration of relay device 60. In FIG. 6, HMI 200-1 and HMI 200-2 are collectively referred to as HMI 200.

Referring to FIG. 6, relay device 60 includes arbitration means 300 and transmission and reception management means 680. Arbitration means 300 arbitrates data set 50 exchanged between controller 100 and HMI 200. Transmission and reception management means 680 transmits data set 50 transmitted from controller 100 to each of HMIs 200-1, 200-2. The type of process data 52 stored in data set 50 transmitted from controller 100 is determined by arbitration means 300. The transmission destination of each data set 50 transmitted from controller 100 is also determined by arbitration means 300.

Arbitration means 300 includes subscription list management means 320, process data acquisition means 330, determination means 340, and notification means 350.

Subscription list management means 320 acquires the information about application 220 executed in each of HMIs 200-1, 200-2 connected to relay device 60. The information about application 220 is information capable of specifying process data 52 used for application 220. For example, subscription list management means 320 analyzes the subscription request from HMI 200 and acquires the information about application 220 currently executed by HMI 200. At this point, subscription list management means 320 corresponds to an implementation example of the acquisition means.

When executed application 220 is changed, HMI 200 makes a subscription request to relay device 60. The subscription request includes the subscription start request starting the subscription and the subscription stop request stopping the subscription. The subscription start request and the subscription stop request are output from communication processing unit 90 at timing when application 220 of the execution target is switched.

Subscription list management means 320 manages subscription list 612 capable of specifying process data 52 of the subscription target in control system 1 and HMI 200 in which process data 52 is set to the subscription target. Subscription list management means 320 specifies process data 52 used in application 220 executed by HMI 200 based on the subscription request from HMI 200, and registers (updates) the process data in subscription list 612 as the subscription target. Subscription list management means 320 specifies process data 52 of which the subscription is stopped based on the subscription request from HMI 200, and reflects (updates) the stop of the subscription in subscription list 612. When subscription list 612 is updated, subscription list management means 320 notifies determination means 340 of the update (update notification in FIG. 6).

Process data acquisition means 330 manages process data list 622 that defines correspondence between process data 52 and controller 100 that distributes process data 52. When the communication between relay device 60 and controller 100 is established, process data acquisition means 330 requests controller 100 to transmit the information indicating managed process data 52. Upon receiving the information indicating process data 52 (process data information in FIG. 6), process data acquisition means 330 checks whether the correspondence between controller 100 and process data 52 managed by controller 100 is registered in process data list 622. When the correspondence is not registered, process data acquisition means 330 registers (updates) the correspondence between controller 100 and process data 52 managed by controller 100 in process data list 622.

Upon receiving the update notification from subscription list management means 320, determination means 340 determines transmission setting 400 in order to transmit process data 52 of the subscription target. Determination means 340 specifies process data 52 used by currently-executed application 220 based on subscription list 612. Determination means 340 groups the process data specified based on process data list 622 for each controller 100 that manages the process data. Determination means 340 determines transmission setting 400 of controller 100 that manages a group of process data 52 for each group of grouped process data 52. Transmission setting 400 defines process data 52 to be included in each data set 50. A method for determining transmission setting 400 will be described later. Furthermore, when transmission setting 400 and link information 98 are already generated, determination means 340 may further refer to accumulation information 623 accumulated until the timing of determining transmission setting 400, and define process data 52 to be included in each data set 50.

Determination means 340 generates link information 98 of each HMI 200 based on determined transmission setting 400 of each controller 100. As described above, link information 98 is information specifying process data 52 stored in each data set 50. Link information 98 may be any information in which communication processing unit 90 of HMI 200 can specify the data storing process data 52 of the subscription target and the storage destination of the data storing process data 52 of the subscription target in the data receivable by communication processing unit 90 of HMI 200. For example, when relay device 60 changes a header (name) of data set 50 transmitted by controller 100, information in which the header changed by relay device 60 is associated with the type of process data 52 stored in the data of the header becomes link information 98.

Determination means 340 may store determined transmission setting 400 and link information 98 as accumulation information 623. Determination means 340 may store subscription list 612 when transmission setting 400 is determined together with transmission setting 400 as accumulation information 623. That is, accumulation information 623 is information in which the process data of the subscription target is associated with the transmission setting delivering the process data.

As accumulation information 623 increases, the arithmetic calculation of determination means 340 becomes easy, and appropriate transmission setting 400 can be designed according to the use situation.

Notification means 350 notifies controller 100 of transmission setting 400 obtained by determination means 340, and notifies HMI 200 of link information 98. When link information 98 is generated for each HMI 200, each link information 98 is transmitted to corresponding HMI 200.

Notification means 350 updates the information of topic list 682 that defines the transmission destination of each data set 50 based on transmission setting 400 and subscription list 612.

Transmission and reception management means 680 refers to topic list 682 to transmit each data set 50 delivered from controller 100 to HMI 200 in which the process data 52 included in data set 50 is the subscription target.

<D. Functional Configuration of Determination Means 340>

Figure 7:
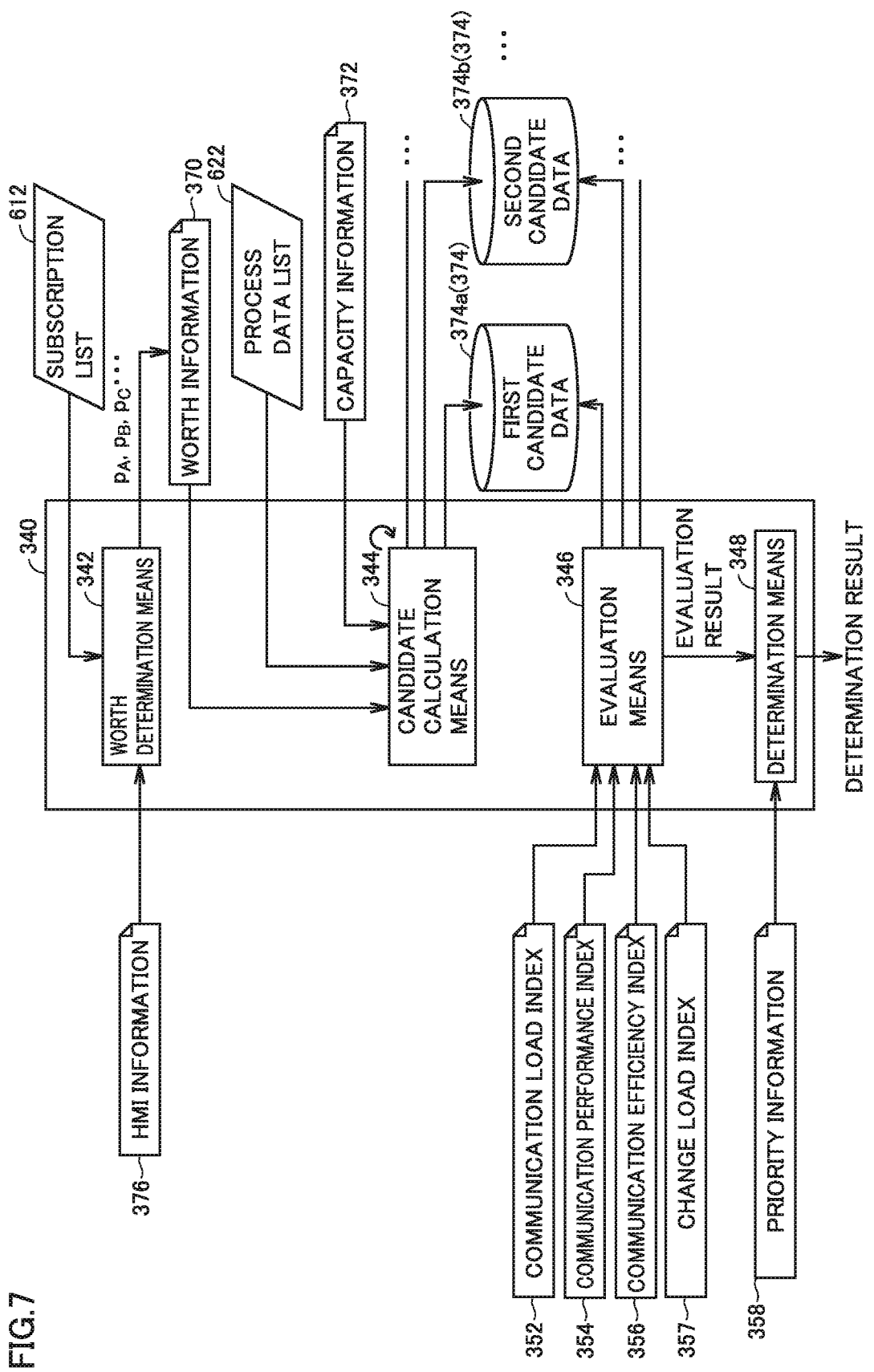
FIG. 7 is a view illustrating an example of arithmetic calculation executed by determination means 340.

With reference to FIG. 7, an example of a calculation method executed by determination means 340 will be described. FIG. 7 is a view illustrating an example of arithmetic calculation executed by determination means 340. In the example of FIG. 7, determination means 340 obtains a combination candidate of process data 52 transmitting a problem obtaining a combination of process data 52 as a "knapsack problem". When a plurality of acquired candidates exist, determination means 340 evaluates each candidate according to an evaluation index that is not incorporated in the "knapsack problem".

In the embodiment, as a typical example, determination means 340 determines process data 52 to be included in data set 50 according to a predetermined evaluation criterion regarding the communication load.

Referring to FIG. 7, determination means 340 includes worth determination means 342, candidate calculation means 344, evaluation means 346, and determination means 348.

Worth determination means 342 determines the worth of process data 52. For example, worth determination means 342 converts the importance of process data 52 in the entire system into the worth. Specifically, worth determination means 342 refers to subscription list 612, specifies process data 52 necessary for each application 220 executed in each HMI 200, determines the worth of each process data 52, and generates worth information 370 indicating the worth of each process data 52.

For example, worth determination means 342 estimates the worth of the process data 52 from the frequency at which the process data 52 is used and the importance of HMI 200 using the process data 52 in the system. The evaluation criterion based on at least one of the frequency at which each of the plurality of pieces of process data 52 is used in each application and the importance set to each of the plurality of pieces of process data 52 may be used.

For example, importance of HMI 200 that uses process data 52 in the system is calculated from HMI information 376. For example, HMI information 376 includes information that can specify which HMI 200 is registered as a master unit and which HMI 200 is registered as an auxiliary unit. HMI information 376 may include an operation status indicating a use frequency of HMI 200. In the embodiment, HMI information 376 is information indicating the master unit and the auxiliary unit.

HMI 200-1 according to the embodiment is the master unit (mainly-used HMI) in control system 1, and HMI 200-2 is the auxiliary unit (HMI used as a sub unit) in control system 1. The information is registered as HMI information 376. For example, HMI information 376 is registered by the user when application 220 is installed in HMI 200 or when application 220 is developed.

For example, a worth p of one piece of process data 52 is calculated by the following Equation (1).

Mathematical Formula 1

$$p = \sum_{i=1}^{i=2} \alpha_i n \quad (1)$$

At this point, i specifies the type of HMI 200, i=1 indicates HMI 200-1, and i=2 indicates HMI 200-2. α is importance in the system of HMI 200 obtained from HMI information 376. n indicates a frequency at which process data 52 is used in application 220 executed by HMI 200. For example, when HMI 200 can execute five applications 220 and specific process data 52 is used by three applications 220 among five applications 220, frequency n at which process data 52 is used becomes ⅗. An actually-measured value of the use frequency of the application may be reflected in frequency n.

The worth calculation method is an example, and for example, the worth of process data 52 itself may be further reflected in the above Equation (1). For example, the high worth may be given to process data 52 used for determination of generation of an error, and the lower worth may be given to process data 52 used for logging than process data 52 used for the determination of the generation of the error.

In FIG. 7, $p_A$ indicates the worth of process data 52A, $p_B$ indicates the worth of process data 52B, and $p_C$ indicates the worth of process data 52C. Worth information 370 may be predetermined. That is, worth determination means 342 may determine the worth of each of process data necessary for each application 220 executed in each HMI 200 acquired by subscription list management means 320 based on predetermined worth information 370.

Candidate calculation means 344 sets a data size of process data 52 to a "weight", the worth of process data 52 estimated by worth determination means 342 to the "worth", and the data capacity of one packet to "a capacity of knapsack", and determines a combination of process data 52 that maximizes the sum of worth of process data 52 stored in one packet.

The data size of process data 52 is predetermined. For example, the information about the data size is included in the process data information transmitted by controller 100.

The data capacity of the packet is obtained as capacity information 372. Capacity information 372 may be information determined previously as the performance of information system network 2, or information set to a temporary value by the user.

Candidate calculation means 344 stores the determined combination in candidate data 374 as process data 52 to be included in one data set. Candidate calculation means 344 excludes process data 52 stored in candidate data 374 from the candidates of process data 52 stored in the packet, and again determines the combination of process data 52 that maximizes the sum of the worth of process data 52 stored in one packet.

That is, candidate calculation means 344 determines the combination of process data 52 while including the index evaluating the worth of the process data included in the data set as the evaluation criterion. As a result, for example, transmission setting 400 can be designed such that high-worth process data 52 can be preferentially transmitted.

Specifically, the worth of each determined data set 50 can be determined based on the worth of process data 52 included in data set 50, and transmission setting 400 can be designed to preferentially transmit data set 50 having high worth.

Candidate calculation means 344 repeats the determination of the combination of process data 52, the storage of the determined combination in candidate data 374, and the exclusion of process data 52 stored in candidate data 374 from among the candidates of process data 52 stored in the packet until the candidate of process data 52 stored in the packet is eliminated.

Candidate calculation means 344 may perform a series of processing a plurality of times until the candidate of process data 52 stored in the packet is eliminated, and acquire a plurality of pieces of candidate data (first candidate data 374a, second candidate data 374b, . . . ). When the series of processing is performed the plurality of times, candidate calculation means 344 may change an algorithm determining the combination of process data 52 that maximizes the sum of the worth of process data 52 stored in one packet each time. Although the algorithm is not particularly limited, and examples thereof include a dynamic programming method, a greedy method, and a genetic algorithm.

Furthermore, even when the series of processing is executed by the same algorithm, a plurality of candidate data is obtained when a plurality of solutions are obtained. The processing of candidate calculation means 344 may be terminated when one candidate data is acquired. In the following description, it is assumed that the plurality of pieces of candidate data 374 is acquired.

Evaluation means 346 evaluates each of the plurality of candidate data 374 based on a predetermined index. In the example of FIG. 7, evaluation means 346 evaluates each of the plurality of candidate data 374 based on each of communication load index 352, communication performance index 354, communication efficiency index 356, and change load index 357.

Communication load index 352 is an index evaluating the load when controller 100 transmits data set 50. For example, communication load index 352 uses the number of data sets included in candidate data 374, the number of process data stored in one data set, the data size of one data set, and the like as an index.

When the number of data sets included in candidate data 374 is small, the number of times controller 100 transmits data set 50 can be reduced, an interval for transmitting the data set can be made, and the communication load on controller 100 can be reduced.

That is, when the evaluation is made according to communication load index 352, evaluation means 346 enhances the evaluation of the candidate data 374 of the evaluation target as each of the number of data sets included in candidate data 374, the number of process data stored in one data set, and the data size of one data set is smaller. As a result, transmission setting 400 can be designed such that the load applied to controller 100 is reduced.

Communication performance index 354 is an index evaluating the performance of the data delivered to HMI 200, and is an index evaluating the type of process data that can be received by HMI 200 during a predetermined period and is used in the application executed in HMI 200. For example, communication performance index 354 uses the period in which the data set is transmitted to HMI 200, the type of the process data 52 used in the application executed in HMI 200 among process data 52 included in data set 50 distributed to HMI 200, and the like.

When the evaluation is made according to communication performance index 354, evaluation means 346 enhances the evaluation of candidate data 374 of the evaluation target as the number of types of process data 52 included in data set 50 distributed to HMI 200 during the predetermined period increases. However, the evaluation of candidate data 374 of the evaluation target is higher as the number of types of process data 52 used in HMI 200 is larger, not simply the number of types is larger. As a result, transmission setting 400 capable of reducing the time lag between the timing at which the worth of process data 52 is updated and the timing at which the process data is used by application 220 can be designed. That is, HMI 200 can accurately grasp the state of controller 100.

Communication efficiency index 356 is an index evaluating the communication efficiency between controller 100 and HMI 200. For example, communication efficiency index 356 uses the number of data (pps (packet per second), bps (bit per second)) that needs to be transmitted during a predetermined period as the load applied to information system network 2 that communicably connects controller 100 and HMI 200.

When the evaluation is performed according to communication efficiency index 356, evaluation means 346 enhances the evaluation of candidate data 374 of the evaluation target as the number of data to be transmitted during a predetermined period is smaller. As a result, transmission setting 400 having the good communication efficiency can be designed. More specifically, the traffic can be reduced.

Change load index 357 is an index evaluating the processing load of communication processing unit 80, the processing load of each HMI 200, and the processing load of arbitration means 300 in association with the change of application 220 of the execution target and the change of transmission setting 400.

Determination means 348 determines which candidate data 374 among the plurality of candidate data 374 is appropriate based on the evaluation result of each candidate data 374 by evaluation means 346 according to the plurality of indexes and priority information 358, and sets appropriate candidate data 374 to a determination result.

Priority information 358 is information input by the user, and defines priorities (weighting) of the communication load, the communication performance, and the communication efficiency. Even when the plurality of candidate data 374 is evaluated according to each index by evaluation means 346, there may be no candidate data in which all the indexes are optimal. In this case, by defining the priority of each index using priority information 358, determination means 348 can determine the candidate data considered to be optimal even when there is no candidate data in which all indexes are optimal.

The arithmetic calculation order illustrated in FIG. 7 is an example, and candidate calculation means 344 may determine the combination of process data 52 in consideration of at least one of communication load index 352, communication performance index 354, and communication efficiency index 356 that are referred to by evaluation means 346. That is, the method for calculating the plurality of candidate data 374, evaluating each candidate data 374, and determining transmission setting 400 is an example, and transmission setting 400 may be determined without calculating candidate data 374.

In the example of FIG. 7, the description has been given assuming that the number of communication processing units 80 capable of transmitting each process data 52 of the subscription target acquired by subscription list management means 320 is one. When each process data 52 of the subscription target is transmitted from communication processing units 80 different from each other, each process data 52 of the subscription target is grouped for each type of communication processing unit 80 based on the information obtained by process data acquisition means 330.

Determination means 340 determines the type of the process data to be included in the data set for each group.

<E. User Interface>
(E1. HMI Information)

Figure 8:
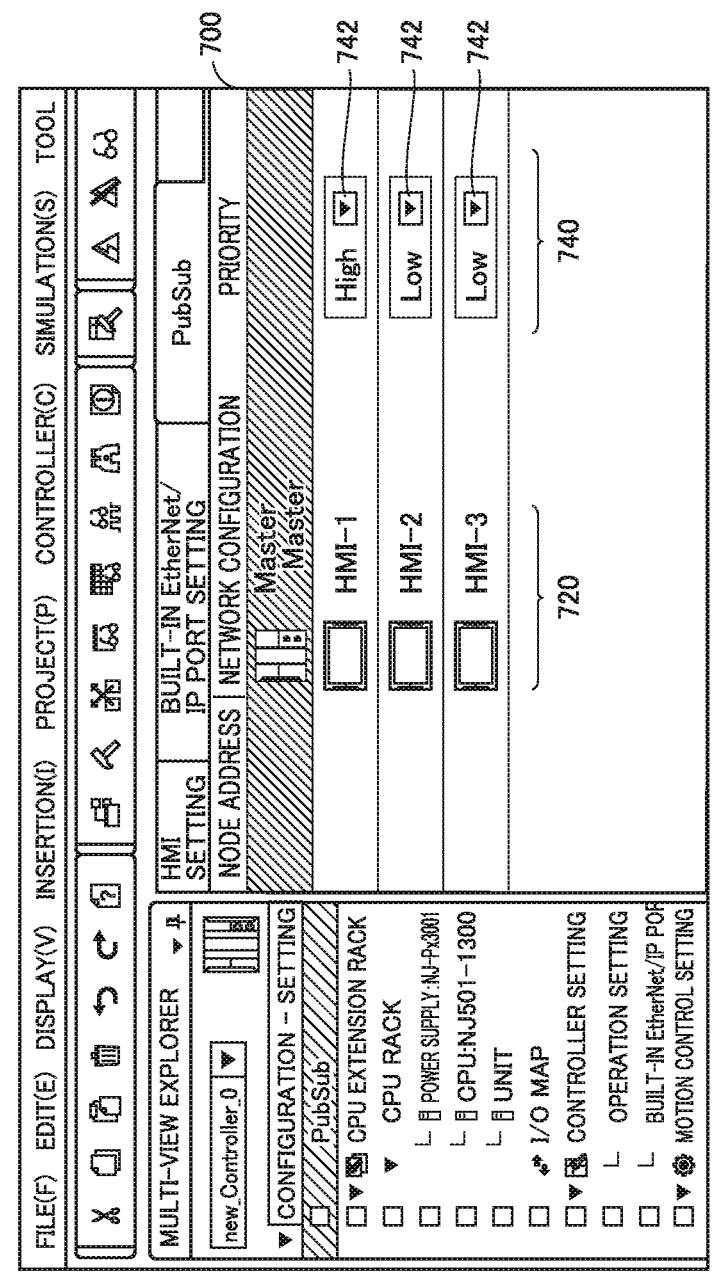
FIG. 8 is a view illustrating an example of a user interface 700 that receives HMI information 376.

FIG. 8 is a view illustrating an example of a user interface 700 that receives HMI information 376. User interface 700 includes a network configuration region 720 indicating a network configuration and a reception region 740 that receives HMI information 376. Network configuration region 720 indicates HMI 200 connected to controller 100 (the master in FIG. 7).

Reception region 740 receives the designation of the priority of HMI 200 connected to controller 100. In the example of FIG. 8, either "High" or "Low" can be selected by operating a tab 742. Thus, which HMI among the plurality of HMIs (HMI-1, HMI-2, HMI-3) capable of displaying the information of controller 100 process data 52 is preferentially transmitted to can be defined. For example, among the plurality of HMIs, the priority of the HMI that functions as the master unit may be set to be high, and the priority of other HMIs may be set to be low, and the master unit and the auxiliary unit may be registered so as to be distinguished from each other.

In this way, the importance of each HMI can be reflected in the worth of process data 52, and for example, transmission setting 400 can be designed such that the process data used in the application executed by arbitrary HMI 200 designated by the user is preferentially distributed.

(E2. Priority Information)

Figure 9:
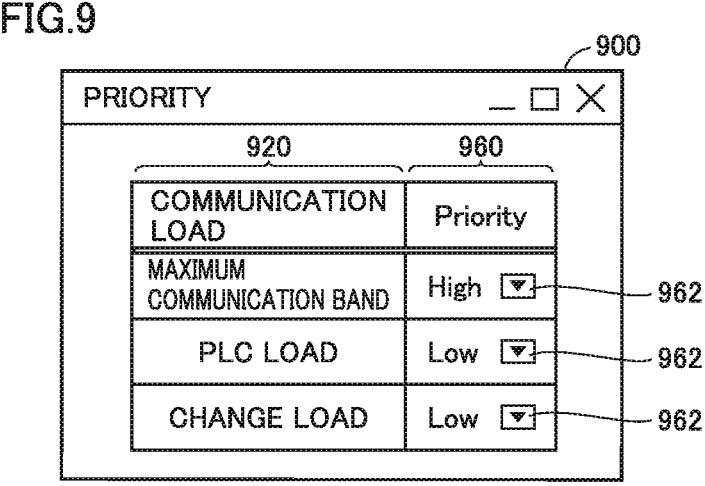
FIG. 9 is a view illustrating an example of a user interface 900 that receives priority information 358.

FIG. 9 is a view illustrating an example of a user interface 900 that receives priority information 358. User interface 900 is provided as one of parameters determining transmission setting 400 before the communication between communication processing unit 80 and HMI 200 is started and at the stage at which the parameter of the management means is designed.

User interface 900 includes an index region 920 indicating the evaluation index and a priority reception region 960 that receives the input of the priority of the evaluation index. A tab 962 of priority reception region 960 is operated to input the priority of each evaluation index.

That is, when the plurality of evaluation indexes are provided, user interface 900 functions as means for receiving the importance of each evaluation index. User interface 900 allows the user to design arbitrary transmission setting 400 by changing the importance of each evaluation index. For example, when the user places importance on the processing speed at which controller 100 executes control program 120, the importance of the index regarding the processing load on controller 100 may be enhanced. On the other hand, when the performance of controller 100 is sufficiently high and when controller 100 can sufficiently execute control program 120 without sufficiently considering the processing load on controller 100, the importance of the index regarding the processing load on controller 100 may be lowered.

<F. Sequence>

Figure 10:
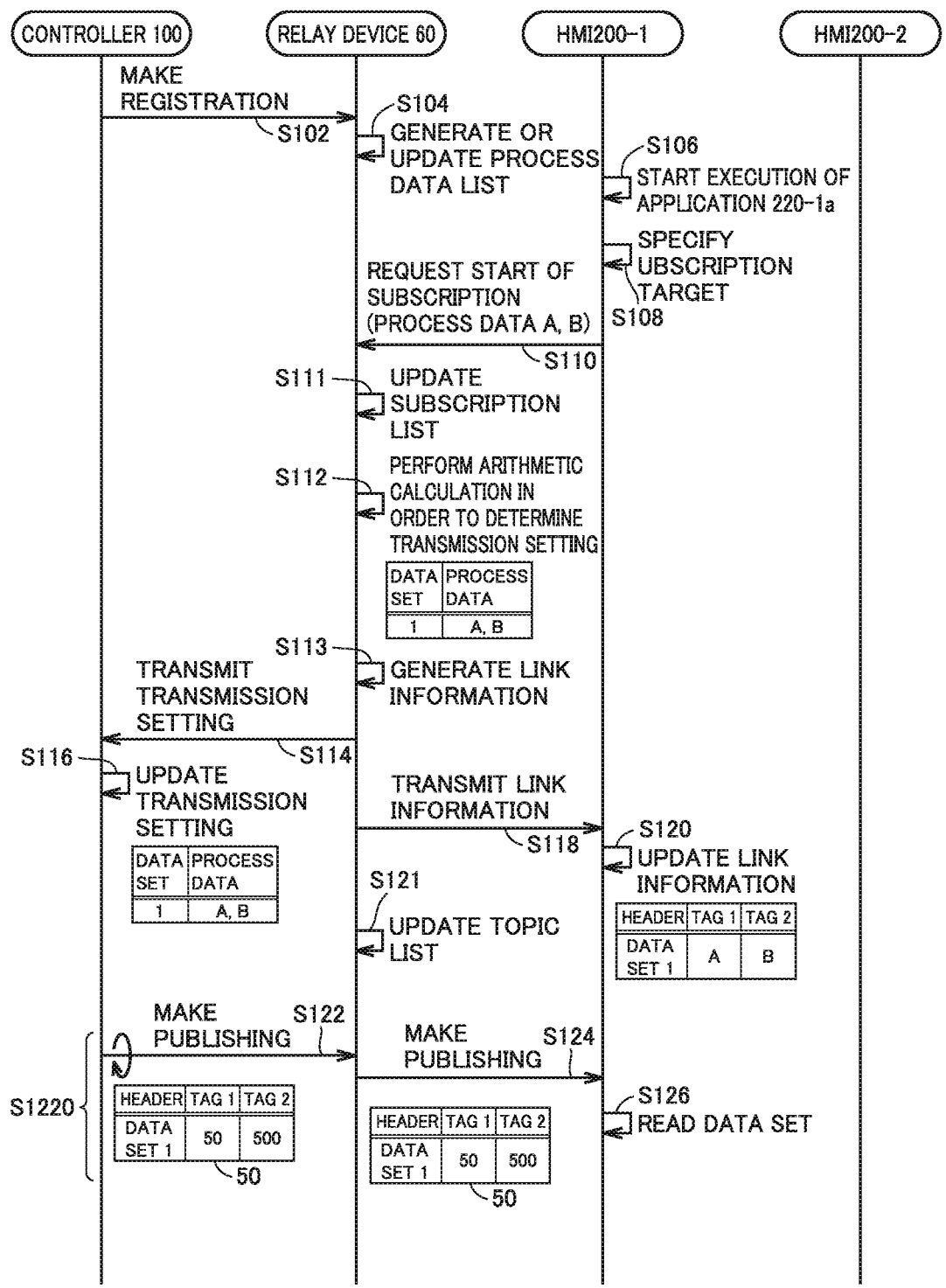
FIG. 10 is a sequence diagram illustrating a flow of a series of processing by a relay device 60.
Figure 11:
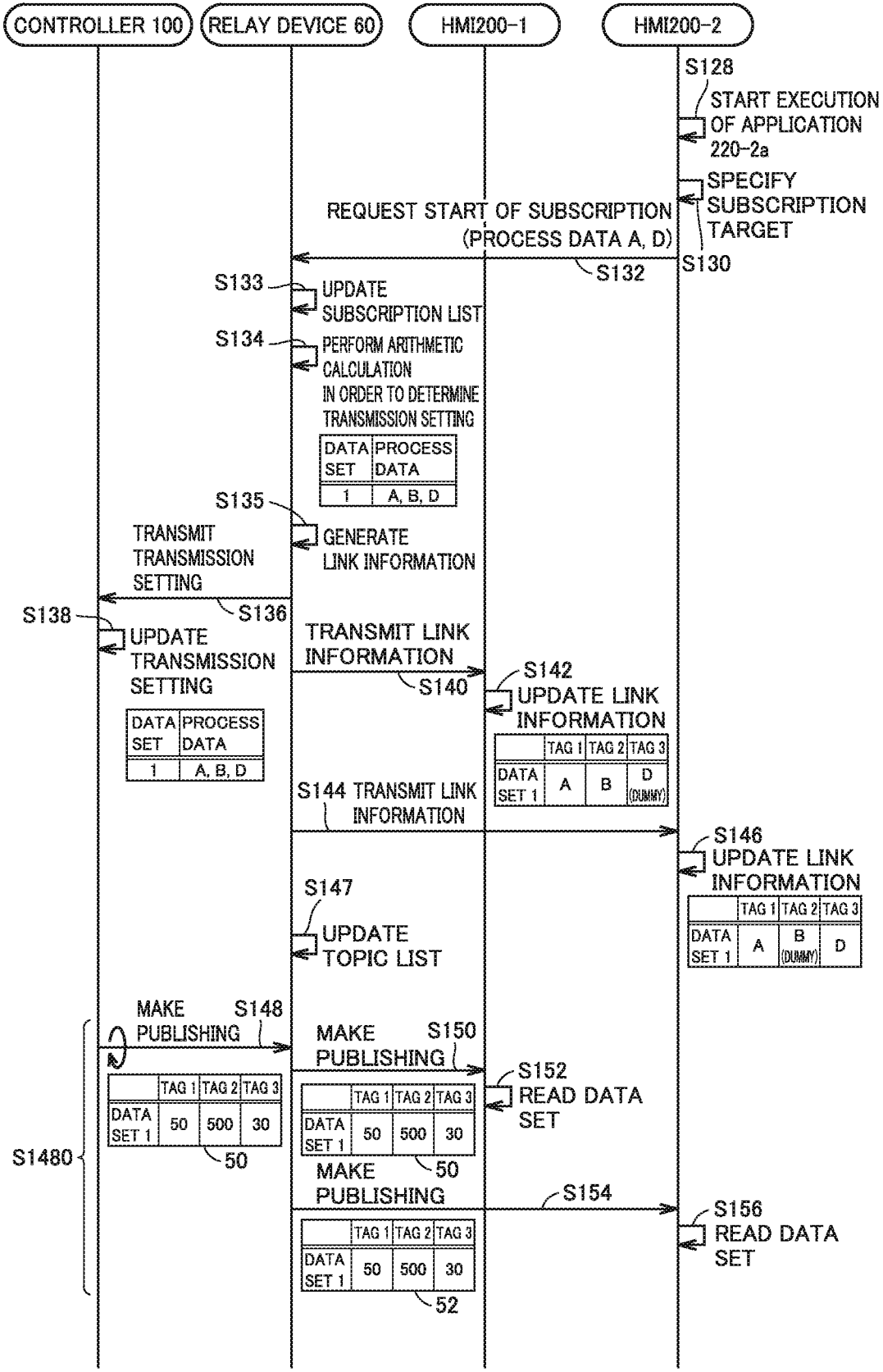
FIG. 11 is a sequence diagram illustrating a flow of a series of processing by the relay device 60.
Figure 12:
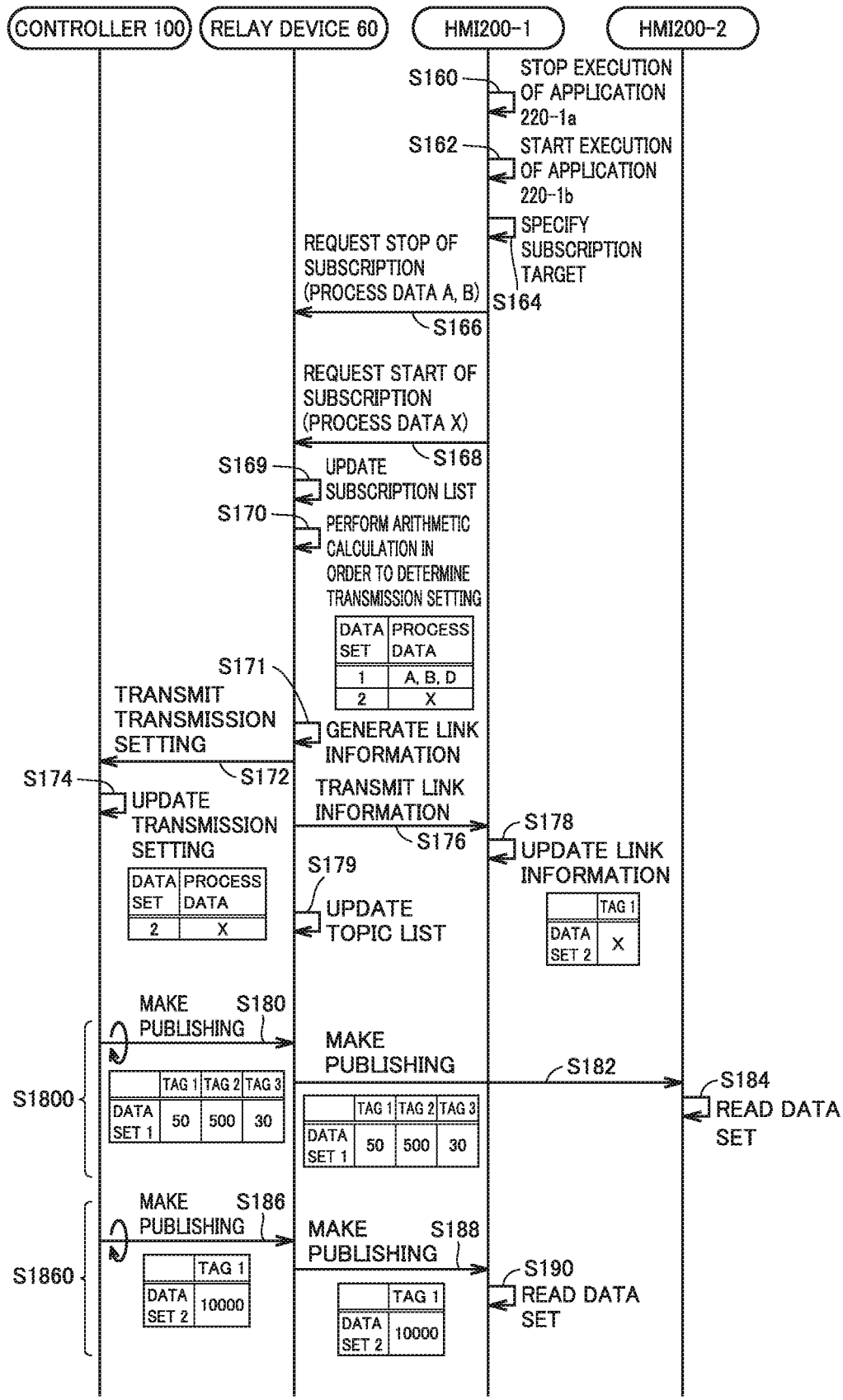
FIG. 12 is a sequence diagram illustrating a flow of a series of processing by the relay device 60.

FIGS. 10 to 12 are sequence diagrams illustrating a flow of a series of processing by relay device 60. Hereinafter, the step is simply referred to as "S".

In S102, controller 100 registers the information indicating the type of process data 52 managed by control means 102.

In S104, relay device 60 generates or updates process data list 622 based on the information registered by controller 100.

In S106, it is assumed that HMI 200-1 starts the execution of application 220-1*a*.

In S108, in association with the start of the execution of application 220-1*a*, HMI 200-1 refers to subscription management information 94 to specify process data 52 necessary for the execution of application 220-1*a* (the specification of the subscription target).

In S110, HMI 200-1 notifies relay device 60 of the start of the subscription (subscription start request). The subscription start request in S110 includes information capable of specifying process data 52 of the subscription target. In the example of FIG. 10, the notification indicating that the subscription of process data A, B is started is sent.

In S111, relay device 60 updates subscription list 612 based on the subscription start request.

In S112, relay device 60 performs the arithmetic calculation in order to determine transmission setting 400. Specifically, relay device 60 refers to subscription list 612 and process data list 622 to determine the type of the process data stored in data set 50 for each of process data A, B such that each of process data A, B is transmitted.

In the example of FIG. 10, in S112, it is determined to store process data A, B in data set 1.

In S113, relay device 60 generates link information 98. Specifically, relay device 60 determines that the header of the data set and which type of process data 52 is to be stored at which position in the data to which the header is attached. Each location in the data can be specified by a tag name. For example, relay device 60 generates link information 98 capable of specifying a header name, a tag name, and a type of the process data stored in a storage destination of the tag name.

In S114, relay device 60 transmits transmission setting 400 that defines the storage of process data A, B in data set 1 to controller 100.

In S116, controller 100 registers transmitted transmission setting 400.

In S118, relay device 60 transmits link information 98 to HMI 200-1.

In S120, HMI 200-1 updates link information 98. In the example of FIG. 10, in the data set having the header name of data set 1, that the data stored in tag 1 is process data A and that the data stored in tag 2 is process data B are registered as link information 98.

In S121, relay device 60 updates topic list 682. Furthermore, relay device 60 may store determined transmission setting 400 and subscription list 612 at the time when transmission setting 400 is determined as accumulation information 623.

In S122, controller 100 generates data set 1 by storing the value of process data A and the value of process data B according to transmission setting 400, and starts the transmission (publishing) of generated data set 1. For example, data set 1 is periodically transmitted.

In S124, relay device 60 refers to topic list 682 to transmit data set 1 transmitted from controller 100 to HMI 200-1.

In S126, HMI 200-1 reads transmitted data set 1, acquires the values of process data A and process data B, and uses the values for the execution of application 220-1a.

The processing of S122 to S126 (referred to as S1220) is periodically repeated until transmission setting 400 regarding data set 1 is changed.

Processing when execution of a new application is started will be described with reference to FIG. 11. In the example of FIG. 11, it is assumed that the execution of application 220-2a is newly started in HMI 200-2. It is assumed that the processing in FIG. 11 is continuation of the processing in FIG. 10.

In S128, it is assumed that HMI 200-2 starts the execution of application 220-2a.

In S130, in association with the start of the execution of application 220-2a, HMI 200-2 refers to subscription management information 94 to specify process data 52 necessary for the execution of application 220-2a (the specification of the subscription target).

In S132, HMI 200-2 notifies relay device 60 of the start of the subscription (subscription start request). The subscription start request in S132 includes information capable of specifying process data 52 of the subscription target. In the example of FIG. 11, the notification indicating that the subscription of process data A, D is started is sent.

In S133, relay device 60 updates subscription list 612 based on the subscription start request.

In S134, relay device 60 performs arithmetic calculation in order to determine transmission setting 400. Specifically, relay device 60 refers to subscription list 612, process data list 622, and accumulation information 623, and determines transmission setting 400 in order to transmit process data 52 of the subscription target from controller 100. Relay device 60 performs the arithmetic calculation determining transmission setting 400 based on the fact that HMI 200-1 continues the subscription to process data A, B and current transmission setting 400. That is, relay device 60 determines transmission setting 400 such that process data A, B can be transmitted to HMI 200-1 and such that process data A, D can be transmitted to HMI 200-2.

In the example of FIG. 11, in S134, it is determined that process data A, B, D are stored in data set 1.

In S135, relay device 60 generates link information 98.

In S136, relay device 60 transmits transmission setting 400 that defines the storage of process data A, B, D in data set 1 to controller 100.

In S138, controller 100 registers transmitted transmission setting 400.

In S140, relay device 60 transmits link information 98 to HMI 200-1.

In S142, HMI 200-1 updates link information 98. In the example of FIG. 11, in the data sets having the header name of data set 1, that the data stored in tag 1 is process data A, that the data stored in tag 2 is process data B, and that the data stored in tag 3 is dummy data are registered as link information 98. At this point, the dummy data means process data that is not the subscription target of HMI 200-1.

In S144, relay device 60 transmits link information 98 to HMI 200-2.

In S146, HMI 200-2 updates link information 98. In the example of FIG. 11, in the data set having the header name of data set 1, that the data stored in tag 1 is process data A, that the data stored in tag 2 is the dummy data, and that the data stored in tag 3 is process data D are registered as link information 98.

In S147, relay device 60 updates topic list 682. Furthermore, relay device 60 may store determined transmission setting 400 and subscription list 612 at the time when transmission setting 400 is determined as accumulation information 623.

In S148, controller 100 generates data set 1 by storing the value of process data A, the value of process data B, and the value of process data D according to transmission setting 400, and starts the transmission (publishing) of generated data set 1. For example, data set 1 is periodically transmitted.

In S150, relay device 60 refers to topic list 682 to transmit data set 1 transmitted from controller 100 to HMI 200-1.

In S152, HMI 200-1 reads transmitted data set 1, acquires the values of process data A and process data B, and uses the values in order to execute application 220-1a.

In S154, relay device 60 refers topic list 682 to transmit data set 1 transmitted from controller 100 to HMI 200-2.

In S156, HMI 200-2 reads transmitted data set 1, acquires the values of process data A and process data D, and uses the values for the execution of application 220-2a.

In this manner, relay device 60 notifies not only HMI 200-2 but also HMI 200-1 of the content of the newly determined process data based on the information specifying the process data used by the application executed by HMI 200-2 acquired from HMI 200-2. Thus, HMI 200-1 and HMI 200-2 can acquire the process data necessary for the application executed in each of HMI 200-1 and HMI 200-2.

The processing of S148 to S156 (referred to as S1480) is periodically repeated until transmission setting 400 regarding data set 1 is changed. That is, the processing of S1220 is not executed when transmission setting 400 is updated in S138.

With reference to FIG. 12, processing when application 220 of the execution target is switched will be described. In the example of FIG. 12, it is assumed that page is switched in HMI 200-1 and application 220 of the execution target is switched from application 220-1a to application 220-1b. It is assumed that the processing in FIG. 12 is a continuation of the processing of FIG. 11.

In S160, HMI 200-1 stops the execution of application 220-1a. In S162, HMI 200-1 starts the execution of application 220-1b.

In S164, HMI 200-1 refers to subscription management information 94 to specify process data 52 stopping the subscription and process data 52 starting the subscription in association with the execution stop of application 220-1a and the execution stop of application 220-1b (the specification of the subscription target).

In S166, HMI 200-1 notifies the relay device 60 of the stop of the subscription (subscription stop request). The subscription stop request in S166 includes information capable of specifying process data 52 stopping the subscription. In the example of FIG. 12, the notification of the subscription stop of process data A, B is sent.

In S168, HMI 200-1 notifies relay device 60 of the start of the subscription (subscription start request). In the example of FIG. 12, the notification indicating that the subscription to process data X is started is sent.

In S169, relay device 60 updates subscription list 612 based on the subscription stop request and the subscription start request.

In S170, relay device 60 performs arithmetic calculation in order to determine transmission setting 400. Specifically, relay device 60 refers to subscription list 612, process data list 622, and accumulation information 623, and determines transmission setting 400 in order to transmit process data 52 of the subscription target from controller 100. Relay device 60 performs the arithmetic operation in order to determine transmission setting 400 based on the fact that HMI 200-2 continues the subscription to process data A, D and current transmission setting 400. That is, relay device 60 determines transmission setting 400 such that process data X can be transmitted to HMI 200-1 and such that process data A, D can be transmitted to HMI 200-2.

In the example of FIG. 12, in S170, it is determined that process data A, B, D are stored in data set 1 and process data X is stored in data set 2. That is, relay device 60 determines that the transmission of data set 2 is started without changing the type of process data 52 stored in data set 1.

In S171, relay device 60 generates link information 98. In the example of FIG. 12, the stop of the transmission of data set 1 to HMI 200-1 and the new start of the transmission of data set 2 to HMI 200-1 are merely changed by changing transmission setting 400, and the transmission of data set 1 to HMI 200-2 is not changed. For this reason, in S171, relay device 60 generates link information 98 for HMI 200-1.

In S172, relay device 60 notifies controller 100 that data set 2 storing process data X is newly transmitted (transmission setting).

In S174, controller 100 registers the transmitted transmission setting. Specifically, the content indicating that data set 2 is newly generated is registered as transmission setting 400 without changing the setting to data set 1.

In S176, relay device 60 transmits link information 98 to HMI 200-1. In S178, HMI 200-1 updates link information 98. In the example of FIG. 12, in the data set having the header name of data set 2, that the data stored in tag 1 is the process data X is registered as link information 98. At this point, because HMI 200-1 does not use process data 52 stored in data set 1 for the execution of application 220-1*b*, the information about already-registered data set 1 may be discarded.

Further, relay device 60 may not newly transmit link information 98 to HMI 200-2. There is no change in the setting generating data set 1 used by HMI 200-2 that executes application 220-2*b*. In addition, HMI 200-2 does not use process data X stored in newly-generated data set 2 in the execution of application 220-2*a*. That is, HMI 200-2 does not need to newly acquire the information about data set 2, and can execute application 220-2*a* when data set 1 can be specified.

In S179, relay device 60 updates topic list 682. In addition, relay device 60 stores determined transmission setting 400 and subscription list 612 at the time when transmission setting 400 is determined as accumulation information 623.

In S180, according to transmission setting 400, controller 100 generates data set 1 by storing the value of process data A, the value of process data B, and the value of process data D, and transmits (publishes) generated data set 1.

In S182, relay device 60 transmits data set 1 transmitted from controller 100 to HMI 200-2.

In S184, HMI 200-2 reads transmitted data set 1, acquires the values of process data A and process data D, and uses the values for the execution of application 220-2*a*.

In S186, according to transmission setting 400, controller 100 generates data set 2 by storing the value of process data X and transmits (publishes) generated data set 2.

In S188, relay device 60 transmits data set 2 transmitted from controller 100 to HMI 200-1.

In S190, HMI 200-1 reads transmitted data set 2, acquires the value of process data X, and uses the value for the execution of application 220-1*b*.

At this point, the processing of S180 to S184 is set to S1800, and is compared with the processing of S1480 in FIG. 11. When comparing S1800 and S1480, the remaining processing is common except that the processing (S150) in which relay device 60 transmits data set 1 to HMI 200-1 and the processing (S152) in which HMI 200-1 reads the data of transmitted data set 1 are not performed in S1800.

That is, only the processing of relay device 60 is changed, and the processing of controller 100 and HMI 200-2 is not changed.

<G. Hardware Configuration>

An example of a hardware configuration of each device included in control system 1 will be described below.

(G1. Hardware Configuration of Relay Device 60)

Figure 13:
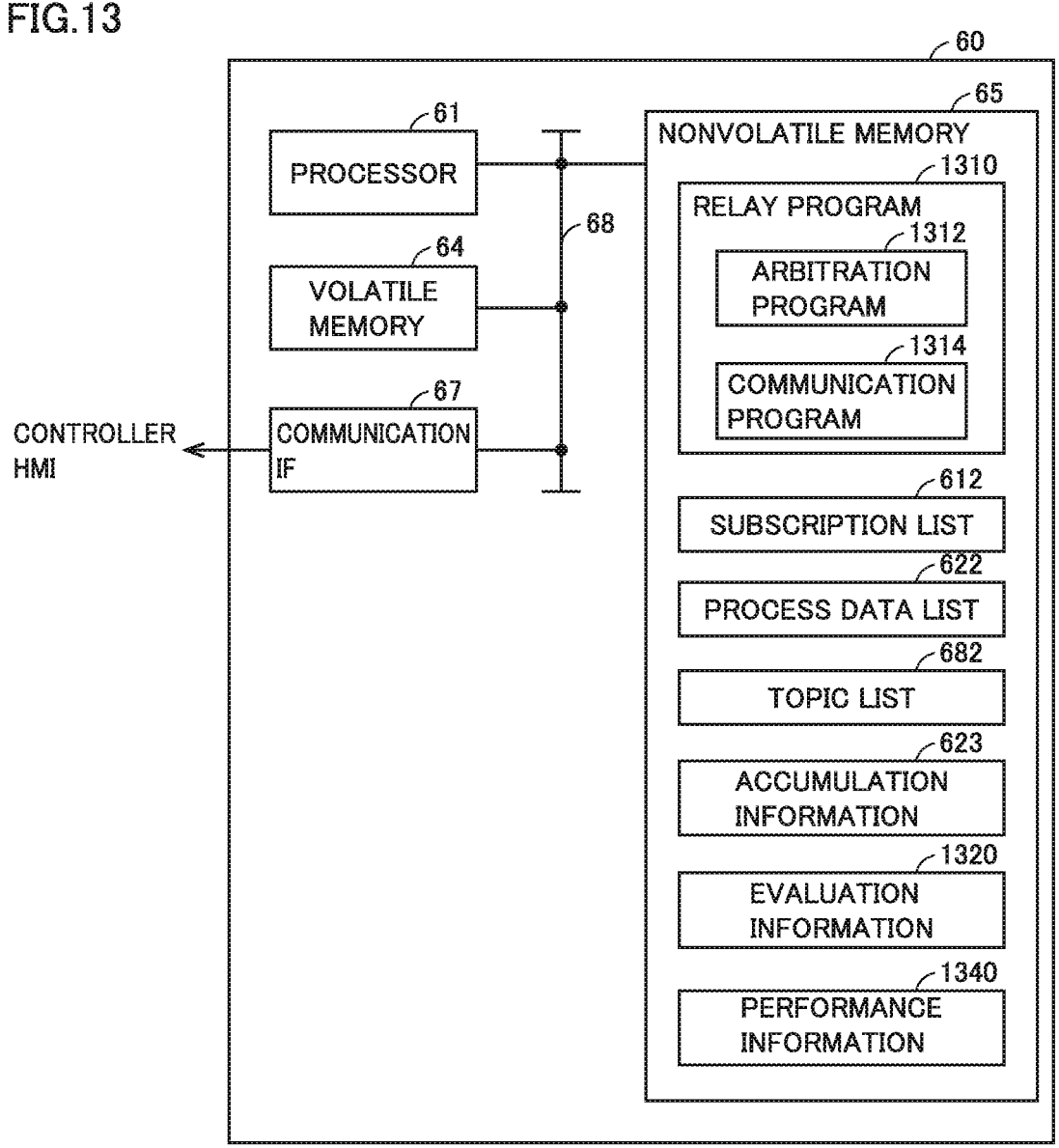
FIG. 13 is a schematic view illustrating an example of a hardware configuration of the relay device 60.

FIG. 13 is a schematic view illustrating an example of a hardware configuration of relay device 60. Referring to FIG. 13, relay device 60 includes a processor 61, a volatile memory 64, a nonvolatile memory 65, and a communication IF 67. These components are connected to each other through a processor bus 68.

Processor 61 includes a central processing unit (CPU), a graphical processing unit (GPU), or the like, and reads a program stored in nonvolatile memory 65, expands the program in volatile memory 64, and executes the program, thereby providing functions for relaying the communication between controller 100 and HMI 200 and determining transmission setting 400.

Volatile memory 64 is configured by a dynamic random access memory (DRAM), a static random access memory (SRAM), or the like. For example, nonvolatile memory 65 is configured by a hard disk drive (HDD) or a solid state drive (SSD), or the like.

Nonvolatile memory 65 stores a relay program 1310, a subscription list 612, a process data list 622, accumulation information 623, a topic list 682, evaluation information 1320, and performance information 1340, in addition to the OS (not illustrated) implementing basic functions.

Relay program 1310 is a program relaying the communication between controller 100 and HMI 200 and determining transmission setting 400, and is executed by processor 61 to provide functions of various means in FIGS. 6 and 7. Relay program 1310 includes an arbitration program 1312 that functions as arbitration means 300 and a communication program 1314 that functions as transmission and reception management means 680.

Evaluation information 1320 includes communication load index 352, communication performance index 354, communication efficiency index 356, and change load index 357 in FIG. 7. Evaluation information 1320 may include HMI information 376 and priority information 358. That is, evaluation information 1320 is information about evaluation criterion 360 referred to by determination means 340.

Performance information 1340 is information including capacity information 372, and is information indicating the performance of controller 100, information system network 2, and HMI 200.

Although the configuration example in which processor 61 executes the program to provide the necessary functions has been described, some or all of these provided functions may be mounted using a dedicated hardware circuit (for example, an application specific integrated circuit (ASIC), a field-programmable gate array (FPGA)). Furthermore, the function provided by relay device 60 may be implemented using a part of the module provided by the OS.

The various programs stored in nonvolatile memory 65 may be installed through the computer-readable recording medium, or installed by being downloaded from the server device or the like on the network.

Communication IF 67 exchanges the data with each device (controller 100, HMI 200) connected to information system network 2.

As described above, relay device 60 temporarily determines optimum transmission setting 400 at certain timing, and changes transmission setting 400 according to the change of application 220 executed on the network. Optimum transmission setting 400 is transmission setting 400 acquired by determination means 340, and what is referred to as "optimum transmission setting 400" differs depending on evaluation criterion 360 referred to by determination means 340.

The use scene of relay device 60 is wide, and relay device 60 can be consistently used from the start to the end of the communication between HMI 200 and controller 100.

(G2. Hardware Configuration of HMI)

Figure 14:
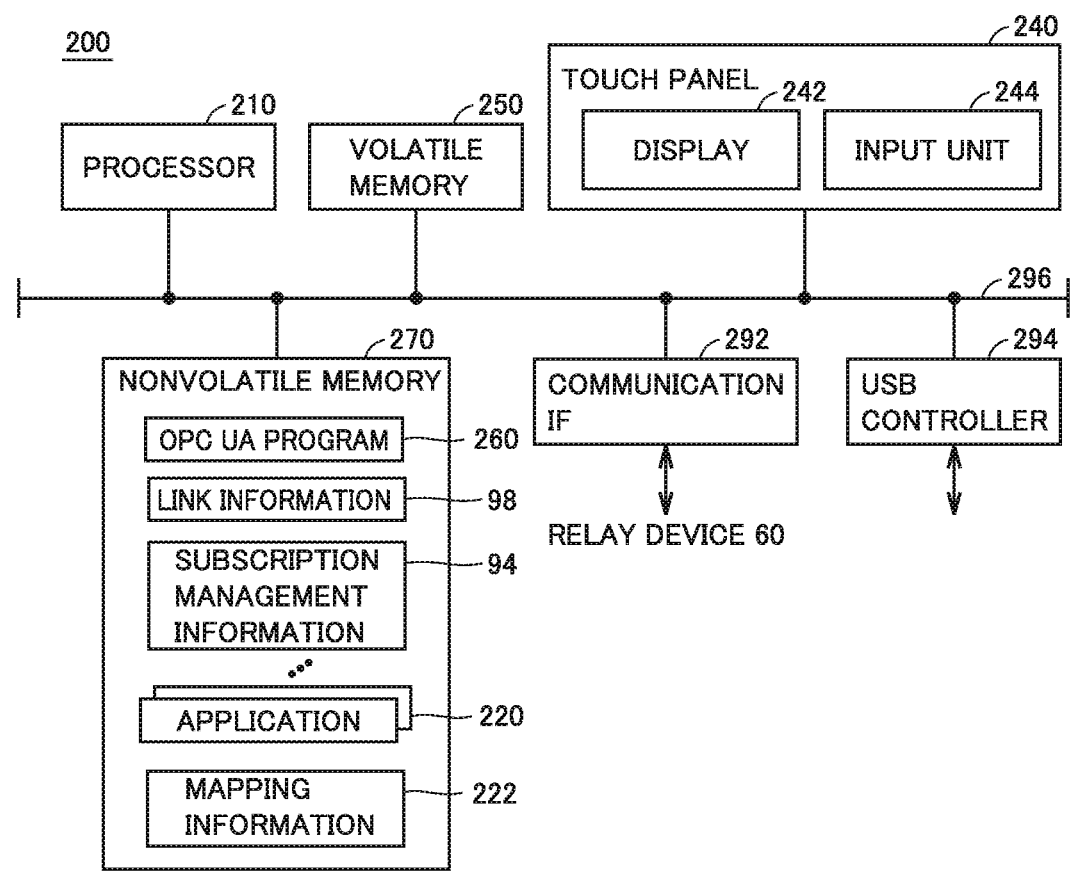
FIG. 14 is a schematic diagram illustrating an example of a hardware configuration of an HMI 200.

FIG. 14 is a schematic diagram illustrating an example of a hardware configuration of HMI 200. As an example, HMI 200 is implemented using hardware (for example, a general-purpose personal computer) according to a general-purpose architecture. HMI 200 may be a stationary type or provided in the form of a notebook personal computer having excellent portability at a manufacturing site where controller 100 is disposed. Referring to FIG. 14, HMI 200 includes a processor 210, a touch panel 240, a volatile memory 250, a nonvolatile memory 270, a communication IF 292, and a USB controller 294. These components are connected to each other through a processor bus 296.

Processor 210 includes a CPU, a GPU, and the like, reads a program stored in nonvolatile memory 270, develops the program in the volatile memory 250, and executes the program, thereby outputting various types of information obtained by executing control program 120 to touch panel 240.

Volatile memory 250 is configured by a DRAM, an SRAM, or the like. For example, nonvolatile memory 270 is configured by an HDD or an SSD.

Nonvolatile memory 270 stores an OPC UA program 260, subscription management information 94, link information 98, one or a plurality of applications 220, and mapping information 222 in addition to an OS (not illustrated) implementing basic functions.

OPC UA program 260 is a program causing HMI 200 to function as the subscriber, and is a program performing the communication according to the OPC UA between controller 100 and HMI 200. Processor 210 executes OPC UA program 260 to provide the functions regarding communication processing unit 90 in FIG. 4. OPC UA program 260 is installed in non-volatile memory 270 from another external storage medium (for example, a memory card or a server device on a network).

Although the configuration example in which the necessary functions are provided by processor 210 executing the program has been described, some or all of these provided functions may be mounted using a dedicated hardware circuit (for example, ASIC or FPGA). In addition, the function provided by HMI 200 may be implemented using a part of the module provided by the OS.

Touch panel 240 includes a display 242 that is the display and an input unit 244 that receives the user operation. Display 242 and input unit 244 may be configured separately.

Communication IF 292 is in charge of the data exchange with relay device 60. USB controller 294 is in charge of the data exchange with arbitrary information processing device through USB connection.

(G3. Hardware Configuration of Controller 100)

Figure 15:
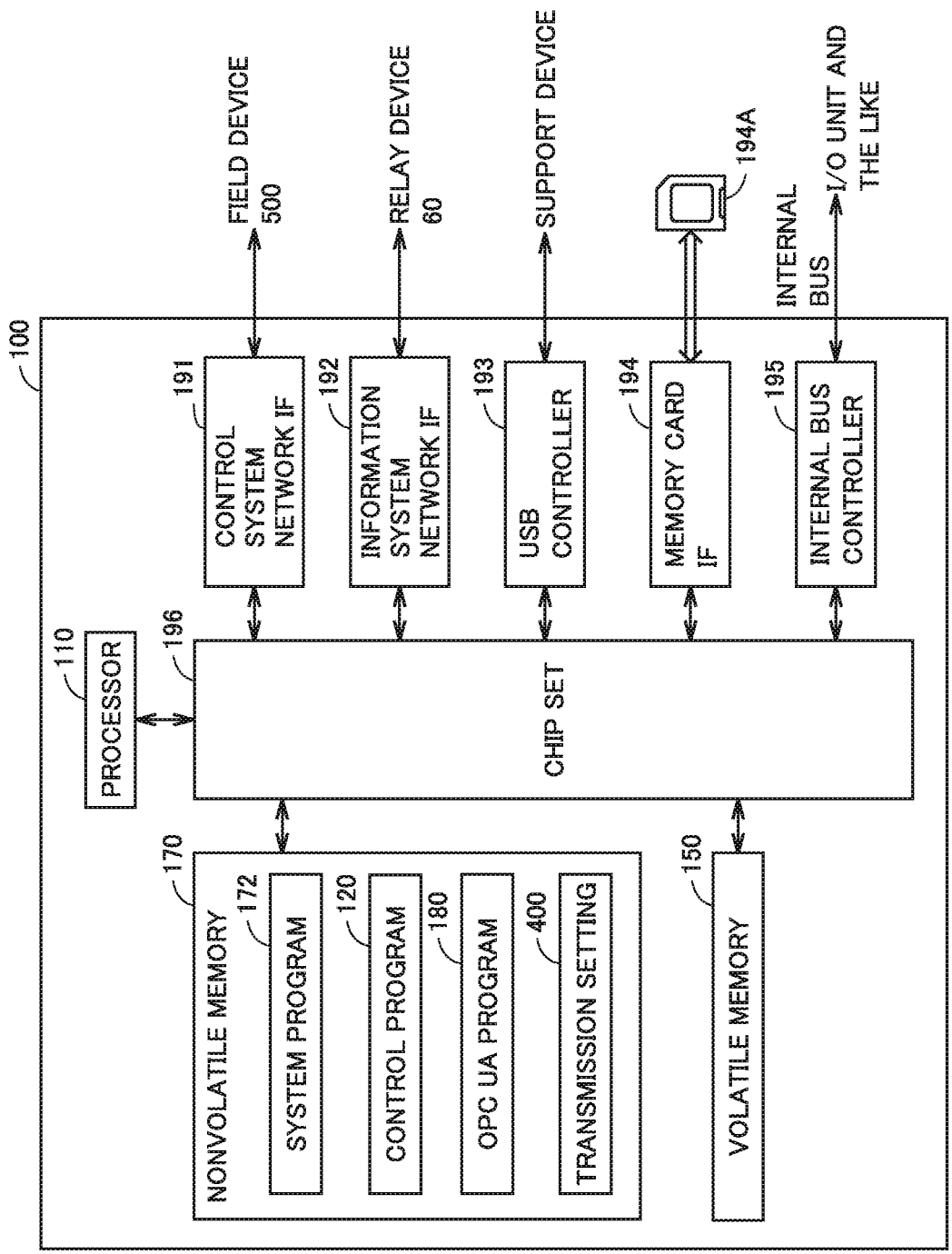
FIG. 15 is a schematic diagram illustrating an example of a hardware configuration of the controller 100.

FIG. 15 is a schematic diagram illustrating an example of a hardware configuration of controller 100. Referring to FIG. 15, controller 100 includes a processor 110, a chipset 196, a nonvolatile memory 170, a volatile memory 150, a control system network IF 191, an information system network IF 192, a USB controller 193, a memory card IF 194, and an internal bus controller 195 as main components.

Processor 110 is configured by a CPU, a GPU, and the like, and reads various programs stored in nonvolatile memory 170, develops the programs in volatile memory 150, and executes the programs, thereby implementing the control of field device 500 and the function as the publisher. A chipset 196 mediates the exchange of data between processor 110 and each component, thereby implementing the processing of controller 100 as a whole.

Nonvolatile memory 170 stores system program 172, control program 120, OPC UA program 180, and transmission setting 400.

System program 172 is a program that provides basic functions of controller 100. Control program 120 is typically a user program generated by the user who operates and designs the support device. Control program 120 and system program 172 cooperate to achieve the control purpose for the user, thereby controlling field device 500. Processor 110 executes system program 172 to provide the function of control means 102, executes control program 120, and updates process data 52 associated with the execution of control program 120.

OPC UA program 180 is a program causing controller 100 to function as the publisher, and is a program performing the communication according to the OPC UA between controller 100 and HMI 200. Processor 110 executes OPC UA program 180 to provide the functions regarding communication processing unit 80 in FIG. 5. For example, OPC UA program 180 may be previously installed in controller 100 as a type of the system program, or installed in nonvolatile memory 170 from another external storage medium (for example, memory card 194A and the server device on the network).

Although the configuration example in which the necessary functions are provided by processor 110 executing the program has been described, some or all of these provided functions may be mounted using a dedicated hardware circuit (for example, ASIC or FPGA). In addition, the main part of controller 100 may be implemented using hardware (for example, an industrial personal computer based on a general-purpose personal computer) according to a general-purpose architecture. In this case, a plurality of OSs having different uses may be executed in parallel using a virtualization technology, and the necessary application may be executed on each OS.

Control system network IF 191 is in charge of the data exchange with field device 500.

Information system network IF 192 is in charge of the data exchange with relay device 60.

USB controller 193 is in charge of the data exchange with an arbitrary information processing device (support device) through the USB connection.

Memory card IF 194 is configured such that memory card 194A is detachable, the data such as the control program and various settings can be written in memory card 194A, and the data such as the control program and various settings can be read from memory card 194A.

Internal bus controller 195 is an interface that exchanges the data with an I/O unit (not illustrated) mounted on controller 100. For the internal bus, a communication protocol unique to a manufacturer may be used, or a communication protocol that is the same as or compliant with any of industrial network protocols may be used.

<H. Modification of Relay Device>

Relay device 60 of the embodiment has been described assuming that the evaluation criterion 360 does not vary. Evaluation criterion 360a may be updated according to the use frequency of the application, the use situation of the communication band of information system network 2, the situation of the load applied to processor 110 of controller 100, and the like.

Figure 16:
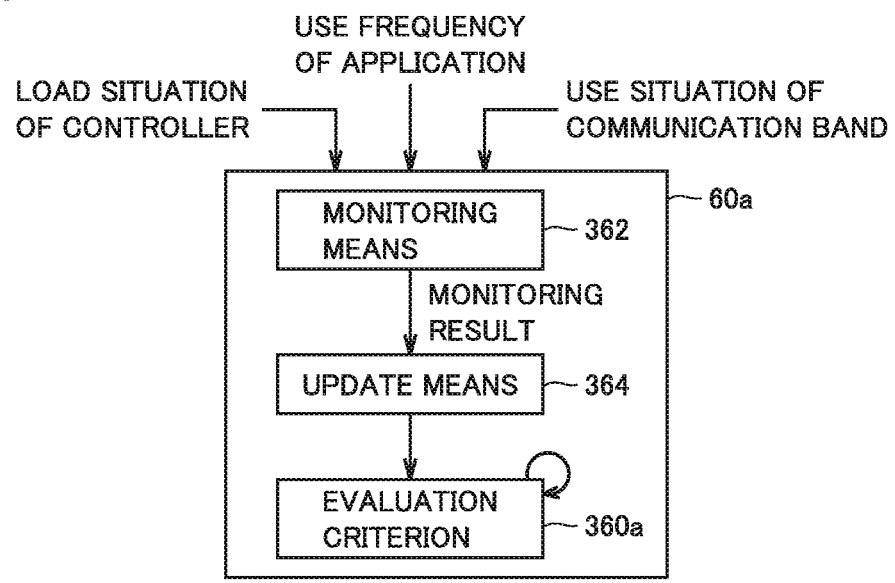
FIG. 16 is a view illustrating a functional configuration of a relay device 60a in a modification.

FIG. 16 is a view illustrating a functional configuration of a relay device 60a in a modification. FIG. 16 illustrates only portions different from the functions of relay device 60 of the embodiment.

Relay device 60a further includes monitoring means 362 and update means 364. Monitoring means 362 monitors the use frequency of the application, the use status of the communication band of information system network 2, and the status of the load applied to controller 100. Monitoring means 362 may specify the use frequency of application 220 based on accumulation information 623.

Update means 364 updates the information about evaluation criterion 360a based on the monitoring result of monitoring means 362. Update means 364 may update the performance of controller 100, information system network 2, HMI 200, and the like in addition to the information about evaluation criterion 360a.

Determination means 340 determines process data 52 to be included in each data set 50 according to evaluation criterion 360a updated by update means 364, and determines transmission setting 400.

<I. Modification of Control System>

Figure 17:
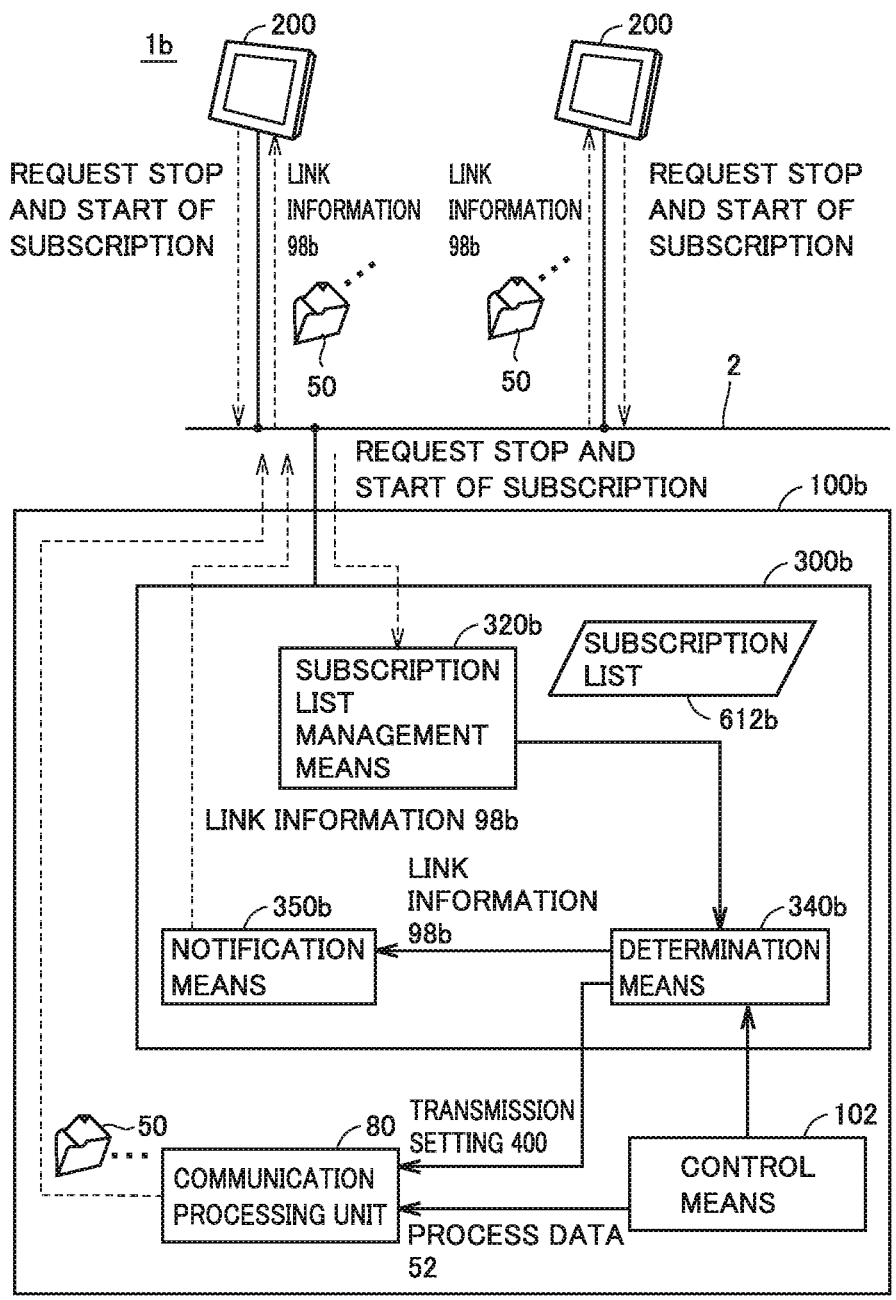
FIG. 17 is a view illustrating an outline of a control system 1b in a modification.

In the above embodiment, the arbitration means is mounted by relay device 60 in control system 1. The arbitration means may be implemented by the controller. FIG. 17 is a view illustrating an outline of a control system 1b in a modification.

Control system 1b includes a controller 100b and the plurality of HMIs 200. Controller 100b and each HMI 200 are communicably connected to each other through information system network 2.

Controller 100b is different from controller 100 in that arbitrating means 300b is included. Arbitration means 300b includes subscription list management means 320b, determination means 340b, and notification means 350b. Control means 102 included in controller 100b functions as process data acquisition means 330 in the above embodiment in order to manage process data 52.

Subscription list management means 320b updates a subscription list 612b based on the subscription stop request and the subscription start request from each HMI 200. Subscription list 612b does not need to store HMI 200 and process data 52 of the subscription target by HMI 200 while HMI 200 and process data 52 are association with each other, and may be information that can specify process data 52 of the subscription target in entire control system 1b.

Determination means 340b determines transmission setting 400 based on the type of process data 52 managed by control means 102 and subscription list 612b. Determination means 340b generates link information 98b capable of specifying the header name of each data set 50, the tag name, and the type of the process data stored in the storage destination of the tag name according to transmission setting 400.

Notification means 350b distributes generated link information 98b to each HMI 200 in a form of multicasting.

Communication processing unit 80 of controller 100b generates data set 50 according to transmission setting 400 determined by determination means 340b, and transmits the data set to each HMI 200 in the form of multicasting.

Each HMI 200 acquires the value of process data 52 of the subscription target from distributed data set 50 based on link information 98.

Control system 1b may include a plurality of controllers 100c. Each controller 100c specifies process data 52 managed in controller 100c in process data 52 of the subscription target in subscription list 612b, determines transmission setting 400 in order to transmit process data 52, and generates link information 98b based on determined transmission setting 400. Each HMI 200 has link information 98b of each controller 100c, and acquires the value of process data 52 of the subscription target from distributed data set 50 based on each link information 98b.

Other Modifications (J1. Information Transmitted by HMI 200) HMI 200 notifies relay device 60 of the process data starting or stopping the subscription as the subscription start request and the subscription stop request.

When the relay device includes subscription management information 94 of each HMI, each HMI 200 may notify the relay device of the information that can specify application 220 that starts the execution and application 220 that stops the execution.

When the relay device includes subscription management information 94, the data set to be generated in order to execute each application is determined every time the generation of transmission setting 400 is repeated, and the arithmetic calculation required for the generation of transmission setting 400 can be facilitated.

(J2. Modification of Method for Implementing Arbitration Means)

In the above embodiment, it has been described that relay device 60 that relays the data exchange between controller 100 and HMI 200 includes the arbitration means. The arbitration means may be implemented as a setting device including only the arbitration means. The setting device only needs to be communicably connected to each controller 100 and each HMI 200.

For example, because the setting device does not relay the data exchange between controller 100 and HMI 200, the setting device may notify controller 100 of transmission setting 400, receive the header attached to the data set generated by controller 100 and information indicating which process data is stored at which position in the header from controller 100, and generate link information 98.

In addition, the HMI may include the function regarding the arbitration means. Any device on the network configured by the publisher and the subscriber may include the function regarding the arbitration means. For example, when a plurality of devices functioning as the subscriber exist, only one of the plurality of devices may include the function regarding the arbitration means. Furthermore, when a plurality of devices functioning as the publisher exist, only one of the plurality of devices may include the function regarding the arbitration means.

(J3. Modification of HMI and Controller)

In the above embodiment, the HMI is the subscriber while the controller is the publisher has been described. Each of the HMI and controller may include both functions of the subscriber and the publisher.

In this case, the control program is configured to be able to use the data distributed from the HMI. The transmission setting of the HMI may be determined by the arbitration means according to the control program. As a method for determining the transmission setting of the HMI, the method for determining transmission setting 400 of controller 100 described above can be used. In this case, the HMI may include the arbitration means.

(J4. Modification Regarding Method for Determining Transmission Setting)

It is not necessary to generate transmission setting 400 such that one application uses all process data 52 included in one data set 50. In this case, evaluation criterion 360 may include an index regarding the load applied to the processing of sorting process data 52 used for application 220 from data set 50.

In addition, transmission setting 400 may be generated in consideration of the period at which process data 52 is updated by controller 100 and the period used in application 220.

§ 3. APPENDIX

As described above, the embodiment includes the following disclosure.

<Configuration 1>

A control system including: a control unit (102*a*) configured to execute a control program (120*a*) controlling a control target while managing a plurality of pieces of process data (52) referred to or updated in the control program;
- a transmission unit (80*a*) configured to generate and transmit a data set (50) including a value of at least part of the process data of the plurality of pieces of process data managed by the control unit;
- an application execution unit (200*a*) configured to execute an application by referring to a data set transmitted by the transmission unit; and
- an arbitration unit (300*a*) configured to arbitrate the data set exchanged between the transmission unit and the application execution unit,
- wherein the arbitration unit includes:
- a first acquisition unit (320*a*) configured to acquire information about the plurality of pieces of process data managed by the control unit;
- a second acquisition unit (330*a*) configured to acquire information about the application executed by the application execution unit;
- a determination unit (340*a*) configured to determine the process data to be included in the data set based on the information about the plurality of pieces of process data acquired by the first acquisition unit and the information about the executed application acquired by the second acquisition unit; and
- a notification unit (350*a*) configured to notify each of the transmission unit and the application execution unit of a content of process data to be included in the data set determined by the determination unit.

<Configuration 2>

The control system described in configuration 1, in which the second acquisition unit acquires information specifying the process data used by a changed application at each time when the application executed by the application execution unit is changed (S106 to S110; S128 to S132).

<Configuration 3>

The control system described in configuration 1 or 2, in which the determination unit determines process data to be included in the data set according to a predetermined evaluation criterion (360) regarding a communication load based on the information about the application acquired by the second acquisition unit.

<Configuration 4>

The control system described in configuration 3, in which the evaluation criterion is based on at least one of a frequency at which each of the plurality of pieces of process data is used in the application executed in the application execution unit and importance set to each of the plurality of pieces of process data.

<Configuration 5>

The control system described in any one of configurations 1 to 4, in which the determination unit determines the process data to be included in the data set at each time.

<Configuration 6>

The control system described in any one of configurations 1 to 4, in which the determination unit selects a data set corresponding to the process data determined to be included in the data set from among a plurality of predetermined data sets.

<Configuration 7>

The control system described in any one of configurations 1 to 6 further including a control device (100) and a display device (200), in which the arbitration unit is disposed independently of the control device and the display device.

<Configuration 8>

The control system described in any one of configurations 1 to 7 further including a plurality of the application execution units including a first application execution unit and a second application execution unit, in which the notification unit also notifies the second application execution unit of a content of the process data newly determined based on the information acquired by the determination unit from the first application execution unit (S140, S144).

<Configuration 9>

A relay device (60) disposed in a control system (1),
the control system including:
- a control unit (102*a*) configured to execute a control program (120*a*) controlling a control target while managing a plurality of pieces of process data referred to or updated in the control program;
- a transmission unit (80*a*) configured to generate and transmit a data set (50) including a value of at least part of the process data of the plurality of pieces of process data managed by the control unit; and
- an application execution unit (200*a*) configured to execute an application by referring to a data set transmitted by the transmission unit,
- the relay device being configured to arbitrate the data set exchanged between the transmission unit and the application execution unit,
- the relay device including:
- a first acquisition unit (320*a*) configured to acquire information about the plurality of pieces of process data managed by the control unit;

a second acquisition unit (330a) configured to acquire information about the application executed by the application execution unit;

a determination unit (340a) configured to determine the process data to be included in the data set based on the information about the plurality of pieces of process data acquired by the first acquisition unit and the information about the executed application acquired by the second acquisition unit; and a notification unit (350a) configured to notify each of the transmission unit and the application execution unit of a content of the process data to be included in the data set determined by the determination unit.

<Configuration 10>

A relay program (1310) executed by an information processing device disposed in a control system, the control system including:

a control unit (102a) configured to execute a control program controlling a control target while managing a plurality of pieces of process data referred to or updated in the control program;

a transmission unit (80a) configured to generate and transmit a data set (50) including a value of at least part of the process data of the plurality of pieces of process data managed by the control unit; and an application execution unit (200a) configured to execute an application by referring to a data set transmitted by the transmission unit, the relay program causing the information processing device to function as a relay device that arbitrates a data set exchanged between the transmission unit and the application execution unit, the relay program causing the information processing device to execute:

acquiring information about the plurality of pieces of process data managed by the control unit;

acquiring information about an application executed by the application execution unit (S110);

determining the process data to be included in the data set based on the acquired information about the plurality of pieces of process data and the acquired information about the acquired and executed application (S111 to S113); and notifying each of the transmission unit and the application execution unit of a content of the process data to be included in the determined data set (S114, S118).

It should be considered that the disclosed embodiment is an example in all respects and not restrictive. The scope of the present invention is defined by not the above description, but the claims, and it is intended that all modifications within the meaning and scope of the claims are included in the present invention. In addition, the inventions described in the embodiment and the modification are intended to be implemented alone or in combination as much as possible.

REFERENCE SIGNS LIST 1, 1a, 1b: control system, 2: information system network, 4: control system network, 50: data set, 52: process data, 54: object, 60, 60a: relay device, 61, 110, 210: processor, 64, 150, 250: volatile memory, 65, 170, 270: non-volatile memory, 68, 296: processor bus, 80, 80a, 90: communication processing unit, 82: data set generation means, 84, 96: communication driver, 92: subscription management means, 94: subscription management information, 98, 98a: link information, 100, 100b, 100c: controller, 102, 102a: control means, 120, 120a: control program, 172: system program, 180, 260: OPC UA program, 191: control system network IF, 192: information system network IF, 193, 294: USB controller, 194: memory card IF, 194A: memory card, 195: internal bus controller, 196: chip set, 200: HMI, 200a: application execution means, 220: application, 222: mapping information, 240: touch panel, 242: display, 244: input unit, 300, 300a, 300b: arbitration means, 320, 320b: subscription list management means, 320a: application information acquisition means, 330, 330a: process data acquisition means, 340, 340a, 340b: determination means, 342: worth determination means, 344: candidate calculation means, 346: evaluation means, 348: determination means, 350, 350a, 350b: notification means, 352: communication load index, 354: communication performance index, 356: communication efficiency index, 357: change load index, 358: priority information, 360, 360a: evaluation criterion, 362: monitoring means, 364: update means, 370: worth information, 372: capacity information, 374: candidate data, 376: HMI information, 400: transmission setting, 500: field device, 612, 612b: subscription list, 612a: application information, 622, 622a: process data list, 623: accumulation information, 680: transmission and reception management means, 682: topic list, 700, 900: user interface, 720: network configuration region, 740: reception region, 742, 962: tab, 920: index region, 960: priority reception region, 1310: relay program, 1312: arbitration program, 1314: communication program, 1320: evaluation information, 1340: performance information

The invention claimed is:

1. A control system comprising:

a controller comprising a processor configured to execute a control program for controlling a control target while managing a plurality of pieces of process data of the control program;

a communication processor configured to generate and transmit a data set including a value of at least part of the process data of the plurality of pieces of process data managed by the controller;

a human machine interface (HMI) comprising a processor configured to execute an application based on the data set transmitted by the communication processor, wherein the communication processor obtains the process data from the controller and transmits the data set to the HMI; and a relay device configured to arbitrate the data set exchanged between the communication processor and the HMI, wherein the relay device comprises a processor configured to:

acquire information about the plurality of pieces of process data managed by the controller;

acquire information about the application executed by the HMI;

determine the process data to be included in the data set according to a predetermined evaluation criterion based on the acquired information about the plurality of pieces of process data and the acquired information about the executed application; and notify each of the communication processor and the HMI of a content of the determined process data to be included in the data set, wherein the controller controls the control target in accordance with the determined process data included in the data set.

2. The control system according to claim 1, wherein the processor of the relay device is further configured to acquire information specifying the process data used by a changed application at each time when the application executed by the HMI is changed.

3. The control system according to claim 1, wherein the processor of the relay device is further configured to determine process data to be included in the data set according to the predetermined evaluation criterion regarding a communication load based on the acquired information about the executed application.

4. The control system according to claim 3, wherein the evaluation criterion is based on at least one of a frequency at which each of the plurality of pieces of process data is used in the application executed in the HMI and an importance set to each of the plurality of pieces of process data.

5. The control system according to claim 1, wherein the processor of the relay device is further configured to determine the process data to be included in the data set at each time.

6. The control system according to claim 1, wherein the processor of the relay device is further configured to select a data set corresponding to the process data determined to be included in the data set from among a plurality of predetermined data sets.

7. The control system according to claim 1, further comprising a control device and a display device,
wherein the relay device is disposed independently of the control device and the display device.

8. The control system according to claim 1, further comprising a plurality of HMIs including a first HMI and a second HMI,
wherein the processor of the relay device is further configured to notify the second HMI of a content of the process data newly determined based on the information acquired from the first HMI.

9. A relay device disposed in a control system,
the control system including:
a controller comprising a processor configured to execute a control program for controlling a control target while managing a plurality of pieces of process data of the control program;
a communication processor configured to generate and transmit a data set including a value of at least part of the process data of the plurality of pieces of process data managed by the controller; and
a human machine interface (HMI) comprising a processor configured to execute an application by based on the data set transmitted by the communication processor,
wherein the communication processor obtains the process data from the controller and transmits the data set to the HMI, and
wherein the relay device is configured to arbitrate the data set exchanged between the communication processor and the HMI,
the relay device comprising a processor configured to:
acquire information about the plurality of pieces of process data managed by the controller;
acquire information about the application executed by the HMI;
determine the process data to be included in the data set according to a predetermined evaluation criterion based on the acquired information about the plurality of pieces of process data and the acquired information about the executed application; and
notify each of the communication processor and the HMI of a content of the determined process data to be included in the data set,
wherein the controller controls the control target in accordance with the determined process data included in the data set.

10. A non-transitory computer-readable storage medium storing a relay program executed by an information processing device disposed in a control system,
the control system including:
a controller comprising a processor configured to execute a control program for controlling a control target while managing a plurality of pieces of process of the control program;
a communication processor configured to generate and transmit a data set including a value of at least part of the process data of the plurality of pieces of process data managed by the controller; and
a human machine interface (HMI) comprising a processor configured to execute an application by based on the data set transmitted by the communication processor,
wherein the communication processor obtains the process data from the controller and transmits the data set to the HMI, and
wherein the relay program causes the information processing device to function as a relay device that arbitrates the data set exchanged between the communication processor and the HMI,
the relay program causing the information processing device to execute:
acquiring information about the plurality of pieces of process data managed by the controller;
acquiring information about the application executed by the HMI;
determining the process data to be included in the data set according to a predetermined evaluation criterion based on the acquired information about the plurality of pieces of process data and the acquired information about the executed application; and
notifying each of the communication processor and the HMI of a content of the determined process data to be included in the data set,
wherein the controller controls the control target in accordance with the determined process data included in the data set.

* * * * *